US012674355B2

(12) United States Patent
Zarbeck et al.

(10) Patent No.: US 12,674,355 B2
(45) Date of Patent: Jul. 7, 2026

(54) ROLLING SHUTTER LOCK BAR SLAT

(71) Applicant: Qualitas Manufacturing Incorporated, Itasca, IL (US)

(72) Inventors: Craig N. Zarbeck, Stevensville, MI (US); Tyler Hinckley, Elk Grove Village, IL (US); Tyler Czerwinski, Aurora, IL (US); Robert E. Dutka, Naperville, IL (US)

(73) Assignee: Qualitas Manufacturing Incorporated, Itasca, IL (US)

( * ) Notice: Subject to any disclaimer, the term of this patent is extended or adjusted under 35 U.S.C. 154(b) by 270 days.

(21) Appl. No.: 18/466,578

(22) Filed: Sep. 13, 2023

(65) Prior Publication Data

US 2024/0102342 A1 Mar. 28, 2024

Related U.S. Application Data

(60) Provisional application No. 63/410,043, filed on Sep. 26, 2022.

(51) Int. Cl.
*E06B 9/86* (2006.01)
*E05B 65/00* (2006.01)
(Continued)

(52) U.S. Cl.
CPC ............ *E06B 9/86* (2013.01); *E05B 65/0021* (2013.01); *E06B 9/15* (2013.01); *E06B 2009/1505* (2013.01); *E06B 2009/804* (2013.01)

(58) Field of Classification Search
CPC ...... E06B 9/15; E06B 2009/1505; E06B 9/86; E06B 2009/804; E06B 2009/801; E05B 65/0021
See application file for complete search history.

(56) References Cited

U.S. PATENT DOCUMENTS 630,216 A * 8/1899 Grover ...................... E06B 7/20 49/309
799,475 A * 9/1905 Learned .................... E06B 7/20 49/307

(Continued)

FOREIGN PATENT DOCUMENTS

DE 2232662 1/1974
EP 3450674 B1 4/2021

OTHER PUBLICATIONS

International Patent Appl'n No. PCT/US23/74087 International Search Report, Written Opinion of the International Searching Authority (Jan. 23, 2024).

(Continued)

*Primary Examiner* — Abe Massad
*Assistant Examiner* — John W Hanes, Jr.
(74) *Attorney, Agent, or Firm* — Ice Miller LLP

(57) ABSTRACT

A locking system for a rolling shutter comprises a housing, a body, and a lock bar. The housing has a longitudinal housing channel. The body has a body channel, and is positioned in and moveable transversely within the housing channel. The lock bar is positioned within the body channel, and is moveable longitudinally to the body and housing between a locked position extending away from the body and an unlocked position retracted toward the body. The movement of the body within the housing channel is coupled to the movement of the lock bar between the locked and unlocked positions.

23 Claims, 15 Drawing Sheets

(51) Int. Cl.
*E06B 9/15* (2006.01)
*E06B 9/80* (2006.01)

(56) References Cited

U.S. PATENT DOCUMENTS

| | | | | | |
|---|---|---|---|---|---|
| 1,145,539 | A * | 7/1915 | Bauer | E06B 7/20 | 49/307 |
| 1,682,389 | A * | 8/1928 | Ludeke | E06B 7/20 | 49/308 |
| 2,344,278 | A * | 3/1944 | Balousek | E06B 7/20 | 49/307 |
| 2,555,244 | A * | 5/1951 | Pietrushak | E06B 7/18 | 49/470 |
| 3,078,917 | A | 2/1963 | Recchione | | |
| 3,704,547 | A * | 12/1972 | Hansen | E06B 7/20 | 49/308 |
| 3,850,465 | A * | 11/1974 | Hill | E06B 9/18 | 160/133 |
| 4,035,008 | A * | 7/1977 | Hardt | E06B 9/86 | 292/345 |
| 4,045,913 | A * | 9/1977 | Wright | E06B 7/20 | 49/307 |
| 4,112,640 | A * | 9/1978 | Reifsnyder | E04F 19/10 | 52/177 |
| 4,479,330 | A * | 10/1984 | Muller | E06B 7/20 | 49/303 |
| 4,519,165 | A * | 5/1985 | Cronenberg | E06B 7/215 | 49/306 |
| 4,573,512 | A * | 3/1986 | Lichy | E06B 9/86 | 160/133 |
| 4,805,345 | A * | 2/1989 | Ohi | E06B 7/215 | 49/308 |
| 4,807,687 | A | 2/1989 | Finch et al. | | |
| 4,921,033 | A * | 5/1990 | Finch | E06B 9/13 | 160/264 |
| 5,172,744 | A * | 12/1992 | Finch | E06B 9/174 | 160/133 |
| 5,377,738 | A * | 1/1995 | Cooper | E06B 9/15 | 160/264 |
| 5,573,050 | A * | 11/1996 | Henkenjohann | E06B 9/86 | 160/133 |
| 5,642,588 | A * | 7/1997 | Sowers | E06B 7/215 | 49/307 |
| 5,657,805 | A * | 8/1997 | Magro | E06B 9/581 | 160/133 |
| 5,720,333 | A * | 2/1998 | Turvey | E05B 65/0021 | 160/310 |
| 6,021,837 | A | 2/2000 | Miller | | |
| 6,195,939 | B1 * | 3/2001 | Sowers | E06B 7/21 | 49/307 |
| 6,302,179 | B1 * | 10/2001 | Miller | E06B 9/78 | 160/133 |
| 6,691,761 | B1 * | 2/2004 | Alkhoury | E06B 9/581 | 160/98 |
| 6,742,563 | B2 * | 6/2004 | Belanger | E06B 9/18 | 160/133 |
| 7,128,125 | B2 * | 10/2006 | Harbison | E06B 9/58 | 160/277 |
| 7,469,942 | B2 * | 12/2008 | Whitaker | E05B 65/108 | 70/92 |
| 8,191,602 | B1 * | 6/2012 | Motosko | E06B 9/15 | 160/180 |
| 8,381,448 | B2 * | 2/2013 | Flory | E06B 7/215 | 49/467 |
| 8,616,261 | B2 | 12/2013 | Miller | | |
| 8,925,250 | B2 * | 1/2015 | Parker | E06B 7/21 | 49/306 |
| 8,925,617 | B2 | 1/2015 | Miller | | |
| 9,074,411 | B2 | 7/2015 | Miller et al. | | |
| 9,492,038 | B2 * | 11/2016 | Taingtae | A47K 3/34 | |
| 10,167,666 | B2 * | 1/2019 | Siller | E06B 7/205 | |
| 10,174,545 | B2 * | 1/2019 | Janick | E06B 9/58 | |
| 11,118,395 | B2 * | 9/2021 | Dintheer | E06B 3/46 | |
| 2009/0235602 | A1 | 9/2009 | Ceccofiglio | | |
| 2013/0048231 | A1 * | 2/2013 | Miller | E06B 9/15 | 160/133 |
| 2019/0284874 | A1 * | 9/2019 | Healam | E06B 9/17046 | |
| 2019/0390516 | A1 | 12/2019 | Miller et al. | | |
| 2020/0240205 | A1 * | 7/2020 | Gomaa | E06B 9/15 | |
| 2022/0034162 | A1 | 2/2022 | Elassaad | | |
| 2022/0396984 | A1 | 12/2022 | Zarbeck et al. | | |
| 2023/0366263 | A1 * | 11/2023 | Brunette | E06B 9/174 | |
| 2024/0102342 | A1 * | 3/2024 | Zarbeck | E06B 9/15 | |
| 2024/0110409 | A1 * | 4/2024 | Zarbeck | E06B 9/17046 | |
| 2024/0200405 | A1 * | 6/2024 | Zarbeck | E06B 9/86 | |
| 2024/0247538 | A1 * | 7/2024 | Miller | E06B 3/827 | |
| 2024/0309698 | A1 * | 9/2024 | Melamed | E06B 9/17046 | |

OTHER PUBLICATIONS

International Patent Application No. PCT/US2023/074087 International Preliminary Report On Patentability (Apr. 10, 2025).

* cited by examiner

ROLLING SHUTTER LOCK BAR SLAT

This application claims the benefit of U.S. Provisional Application No. 63/410,043, filed Sep. 26, 2022, which is hereby incorporated by reference herein in its entirety.

BACKGROUND OF THE INVENTION

The present invention relates to rolling shutters and, in particular, to a lock slat for a rolling shutter that prevents the shutter from being raised from the closed position.

Rolling shutters are commonly used in commercial, retail and residential applications as doors or to cover windows or other openings in a structure. The rolling shutter is made of a series of slats that are linked together to form an articulated curtain. The slats typically span the width of the opening, and are formed with an upper edge having a hook-shaped engaging track, and a lower edge having a receiving track that forms a pocket for receiving the engaging track of another slat. The slats are linked by the slidable engagement of the engaging track of a first slat in the receiving track of a second slat, to form a loosely articulated hinge between the slats. In an open position, the rolling shutter is retracted and raised away from the opening by winding the slats about a spindle positioned at the top of the opening. In the closed position, the slats are unwound from the spindle and lowered or extended toward the bottom of the opening. An example of a shutter slat is described in U.S. Pat. No. 9,074,411 to Miller et al., which is incorporated herein by reference.

The opening of the structure commonly includes a frame comprising guide tracks positioned at the sides of the opening. The guide tracks receive the ends of the slats, to align and hold the slats in position to cover the opening. The rolling shutter may incorporate an end retention system to retain the ends of the slats in the guide tracks. In conventional end retention systems, the ends of the slats are formed with a receptacle for receiving an end retention device, such as a fastener with a washer that is retained within a channel of the guide track. Examples of end retention systems are described in U.S. Pat. Nos. 8,616,261 and 8,925,617 to Miller, which are incorporated herein by reference.

The rolling shutter may include a base slat, which is positioned at the end of the series of linked slats to contact the bottom of the opening when the shutter is in the closed position. The base slat may include a seal and/or may be shaped to conform to the bottom of the opening to prevent gaps that would allow intrusion, such as the insertion of a pry tool. The base slat may also include a locking device for securing the rolling shutter in the closed position and prevent it from being raised from the bottom of the opening.

Rolling shutters locking mechanisms commonly comprise a keyed dead bolt or hook bolt. These locking mechanisms are often retrofit on the rolling shutter, and require the operator to take action to secure the rolling shutter. It would be desirable to have a locking mechanism that is integral to the rolling shutter and that secures the rolling shutter automatically, without the need for action by the operator.

SUMMARY OF THE INVENTION

An embodiment of a locking system for a rolling shutter is disclosed, comprising a housing, a body, and a lock bar. The housing has a longitudinal housing channel. The body has opposite first and second ends, and a longitudinal body channel with an opening at the first end. The body is positioned in and moveable transversely within the housing channel. The lock bar is positioned within the body channel and opening, and is moveable longitudinally to the body and housing between a locked position extending away from the body and an unlocked position retracted toward the body. The movement of the body within the housing channel is coupled to the movement of the lock bar between the locked and unlocked positions.

In another embodiment, a lock slat for a rolling shutter comprises a housing, a body, first and second lock bars, and first and second pins. The housing has a longitudinal channel. The body is positioned in and moveable transversely within the channel. The body has first and second body slots, a first end with a first opening, and a second end with a second opening. The first lock bar is positioned within the first opening, and has a first lock bar slot. The second lock bar is positioned within the second opening, and has a second lock bar slot. The first and second pins are coupled to the housing and extend into the channel. The first pin is received in the first body slot and the first lock bar slot, and the second pin is received in the second body slot and the second lock bar slot. The first and second lock bars are moveable longitudinally to the body and housing between a locked position extending away from the body and an unlocked position retracted toward the body. The travel of the first pin within the first and second slots couples the movement of the body to the movement of the lock bar. The movement of the first and second pins within the first and second body slots guides the movement of the body transverse to the housing. The movement of the first pin within the first lock bar slot moves the first lock bar between the locked and unlocked positions. The movement of the second pin within the second lock bar slot moves the second lock bar between the locked and unlocked positions.

In another embodiment, a rolling shutter system for covering a structure opening having a top, a bottom, and opposite sides, comprises a guide track, a stop, and a lock slat. The guide track is positioned on at least one side of the structure opening. The stop is positioned on the guide track. The lock slat comprises a housing, a body and a lock bar. The housing has a longitudinal housing channel. The body is positioned in the housing channel and has a first end with a body opening. The body is moveable transversely within the housing channel between a first position extending away from the housing and a second position retracted toward the housing. The lock bar is positioned within the body opening and is moveable longitudinally to the body and housing between a locked position extending away from the body and into engagement with the stop, and an unlocked position retracted toward the body and away from engagement with the stop. The movement of the lock bar is coupled to the movement of the body. The movement of the body toward the first position moves the lock bar to the unlocked position, and the movement of the body toward the second position moves the lock bar to the locked position.

DETAILED DESCRIPTION OF THE INVENTION

Figure 1:
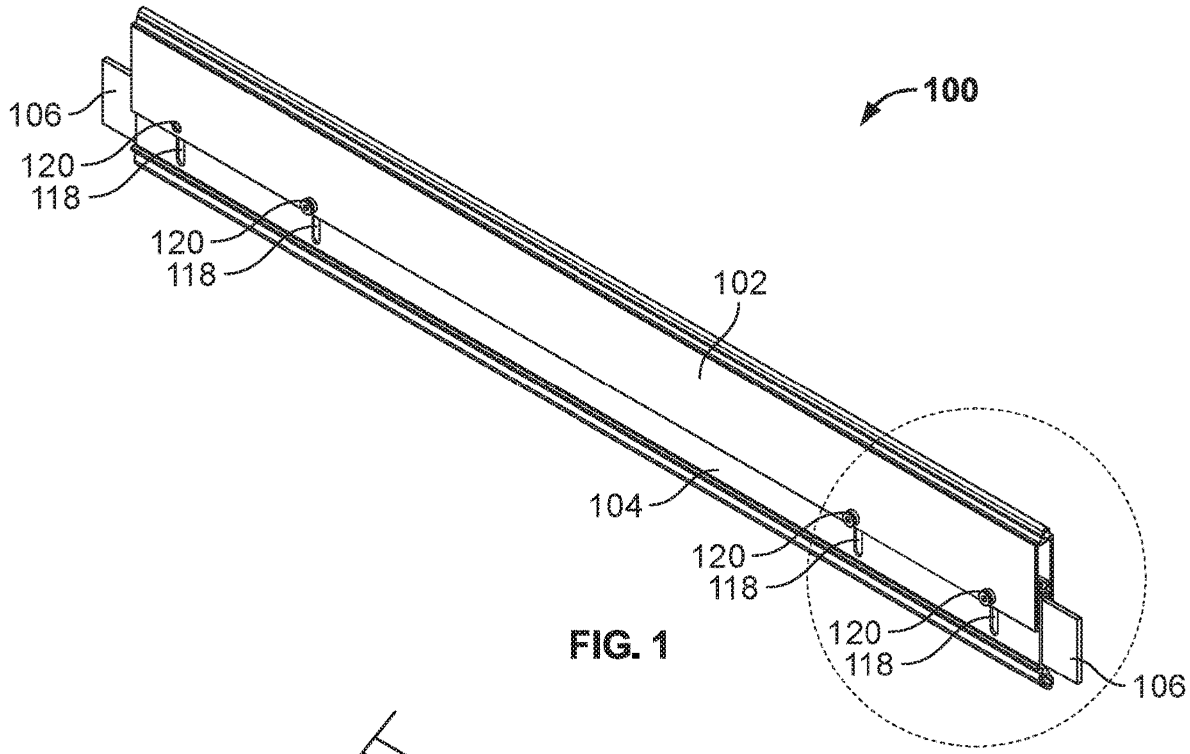
FIG. 1 is an orthographic view of an embodiment of a lock slat in an unlocked position.

Referring to the drawings, an embodiment of a lock slat 100 for a rolling shutter is shown. FIGS. 1-5 show a lock slat 100, comprising a housing 102, a body 104, and a lock bar 106. Housing 102 has top and bottom edges 102*a* and 102*b*, sides 102*c*, and ends 102*d*. In one embodiment, edge 102*a* is positioned at the top of lock slat 100, proximal to the spindle of the rolling shutter, and edge 102*b* is positioned toward the bottom of the lock slat, proximal to the base slat or the bottom of the opening when the slat is in closed position. Housing 102 further comprises a longitudinal housing channel 108 with an opening 110 at edge 102*b*. In one embodiment, opening 110 has an internal lip 112, such that the width of the opening is smaller than the width of the channel 108. Channel 108 and opening 110 are sized and shaped to receive body 104, as described below.

Body 104 has top and bottom edges 104*a* and 104*b*, sides 104*c*, and ends 104*d*. Body 104 further comprises a longitudinal body channel 114 with an opening 116 at an end 104*d* of the body. Channel 114 and opening 116 are sized and shaped to receive lock bar 106, as described below. In a preferred embodiment, body 104 is tube-shaped with channel 114 extending longitudinally through the body with openings 116 at either end of the body.

Figure 2:
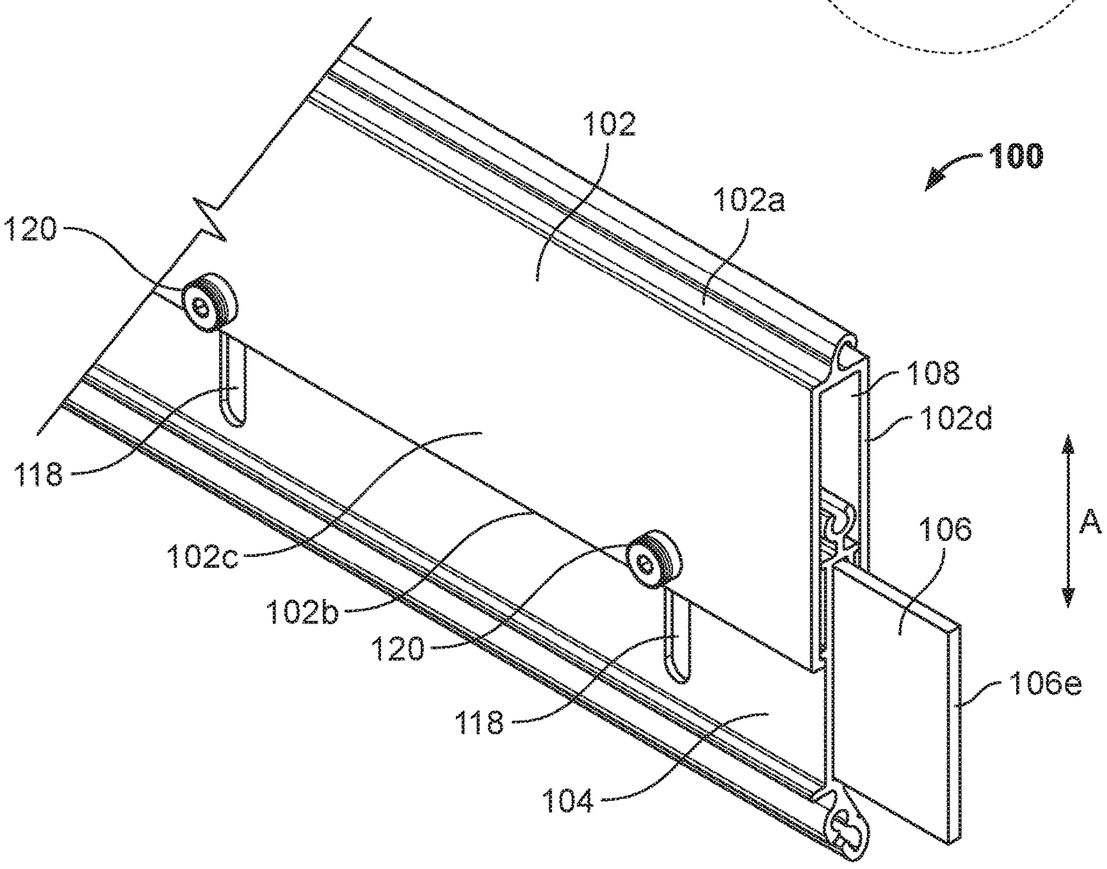
FIG. 2 is a detail view of the lock slat of FIG. 1.
Figure 3A:
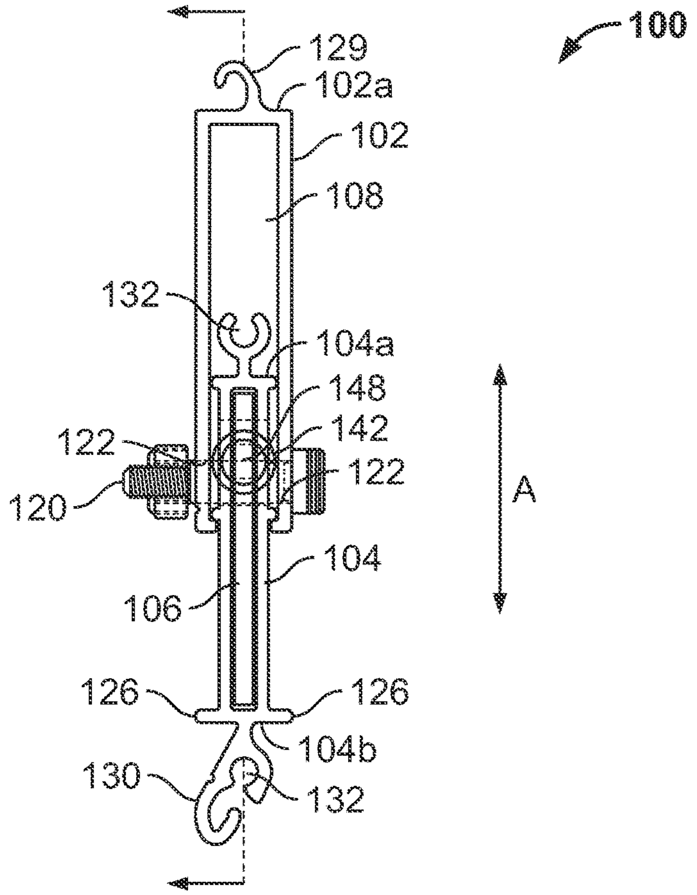
FIG. 3A is a side section view of the lock slat of FIG. 1.
Figure 3B:
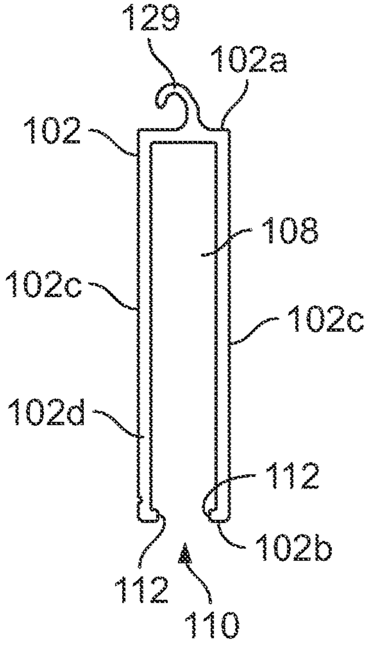
FIG. 3B is a side elevation view of the housing of the lock slat of FIG. 1.
Figure 3C:
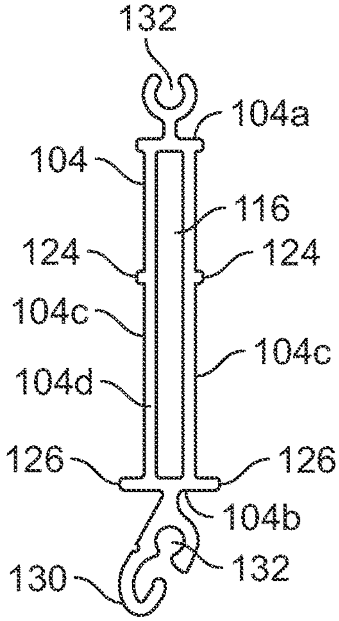
FIG. 3C is a side elevation view of the body of the lock slat of FIG. 1.
Figure 3D:
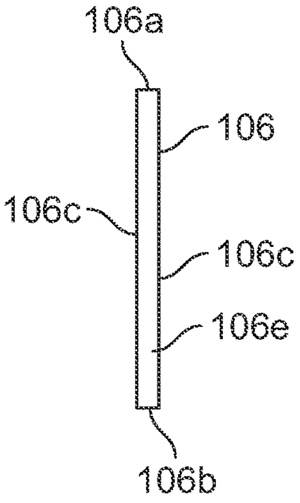
FIG. 3D is a side elevation view of the lock bar of the lock slat of FIG. 1.

Body 104 is slidably received in housing channel 108, with edge 104*a* positioned within the channel. In one embodiment, body edge 104*b* extends from or projects out of housing channel 108 and opening 110. Body 104 is moveable within channel 108 transversely to housing 102, to telescopically increase or decrease the transverse height of lock slat 100, as shown by arrow "A" (FIGS. 2 and 3A).

The transverse movement of body 104 in housing channel 108 is guided by one or more guide slots 118 formed in body sides 104*c*. In one embodiment, guide slots 118 are linear slots that are extend transverse to body 104, and preferably are vertically perpendicular to the longitudinal axis of housing 102 and body 104. Slot 118 has opposite ends 118*a* and 118*b* that are respectively positioned proximal to top edge 104*a* and bottom edge 104*b* of body 104. Housing 102 may have cam pins 120 that extend from sides 102*c* into channel 108, and are received in body guide slots 118. The travel of cam pins 120 in guide slots 118 guides the transverse movement of body 104 in housing channel 108, and restricts the longitudinal movement of the body in the channel. In a preferred embodiment, cam pins 120 are bolts that extend through housing 102 and body 104, and are secured on either side 102*c* of the housing. Housing 102 may have a pair of aligned openings 122 formed in each side 102*c*, and body 104 may have a pair of aligned slots 118 formed in each side 104*c*, to receive and allow bolt 120 to extend through the housing and body.

In one embodiment, body 104 has a rib 124 that projects from one or both sides 104*c*. Rib 124 is sized and shaped to engage internal lip 112 of housing opening 110, and functions as a stop for the transverse movement of body 104 away from housing channel 108. Rib 124 prevents body 104 from being completely withdrawn or removed from channel 108, and limits the maximum height of lock slat 100. In a preferred embodiment, each side 104*c* of body 104 has a longitudinal rib 124 that extends the length of the body.

Body 104 may include a stop 126 that prevents the transverse movement of edge 104*b* toward housing channel 108 and ensures that edge 104*b* is exposed and accessible outside of the channel. In one embodiment, stop 126 is a flange or lip that extends from edge 104*b*, such that edge 104*b* has a width greater than the width of opening 110 of housing channel 108. In a preferred embodiment, flange 126 extends the length of body 104, on either side of edge 104*b*.

Lock bar 106 has top and bottom edges 106*a* and 106*b*, sides 106*c*, and interior and exterior ends 106*d* and 106*e*. Body channel 114 and opening 116 are sized and shaped to slidably receive lock bar 106. In one embodiment, lock bar interior end 106*d* is positioned within body channel 114, and exterior end 106*e* extends from or projects out of opening 116. Lock bar 106 is moveable longitudinally within body channel 114 and opening 116, but is restricted from moving transversely to body 104.

Figure 4:
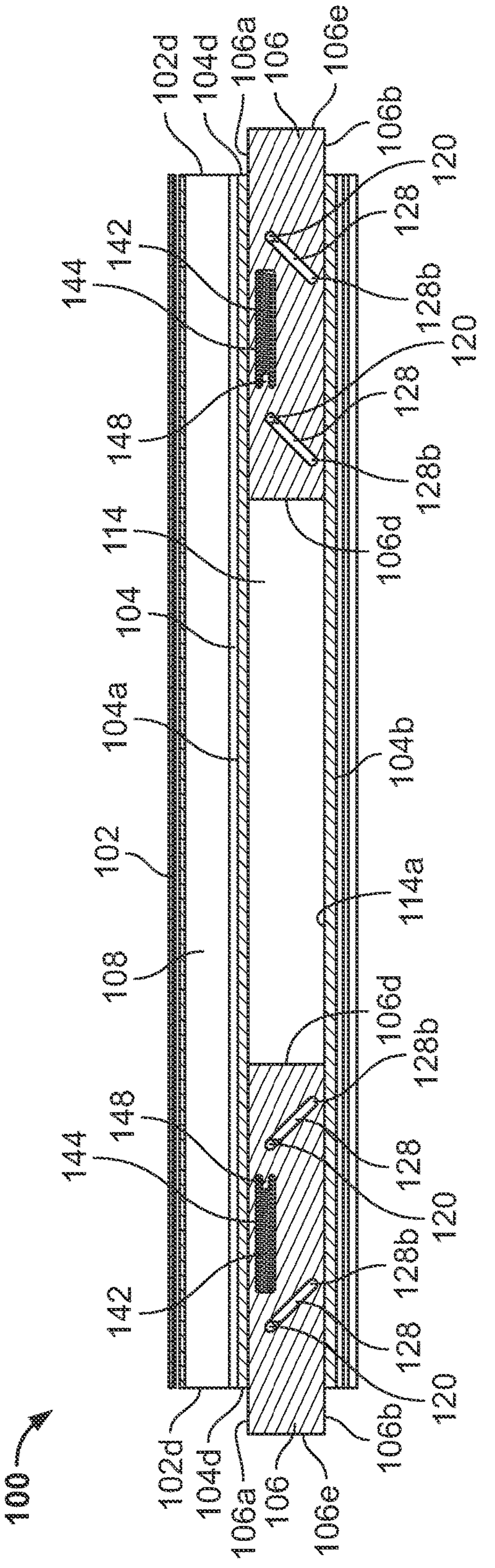
FIG. 4 is a front section view of the lock slat of FIG. 3A.
Figure 5:
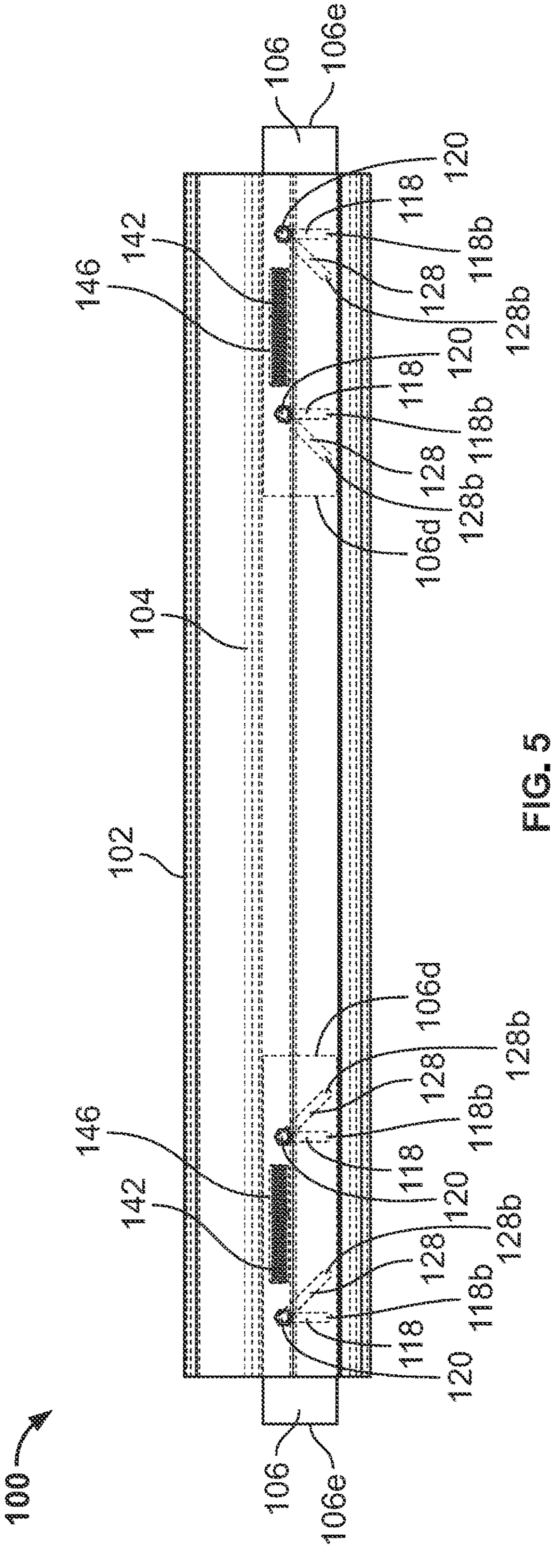
FIG. 5 is a front elevation view of the lock slat of FIG. 4, showing hidden lines.
Figure 6:
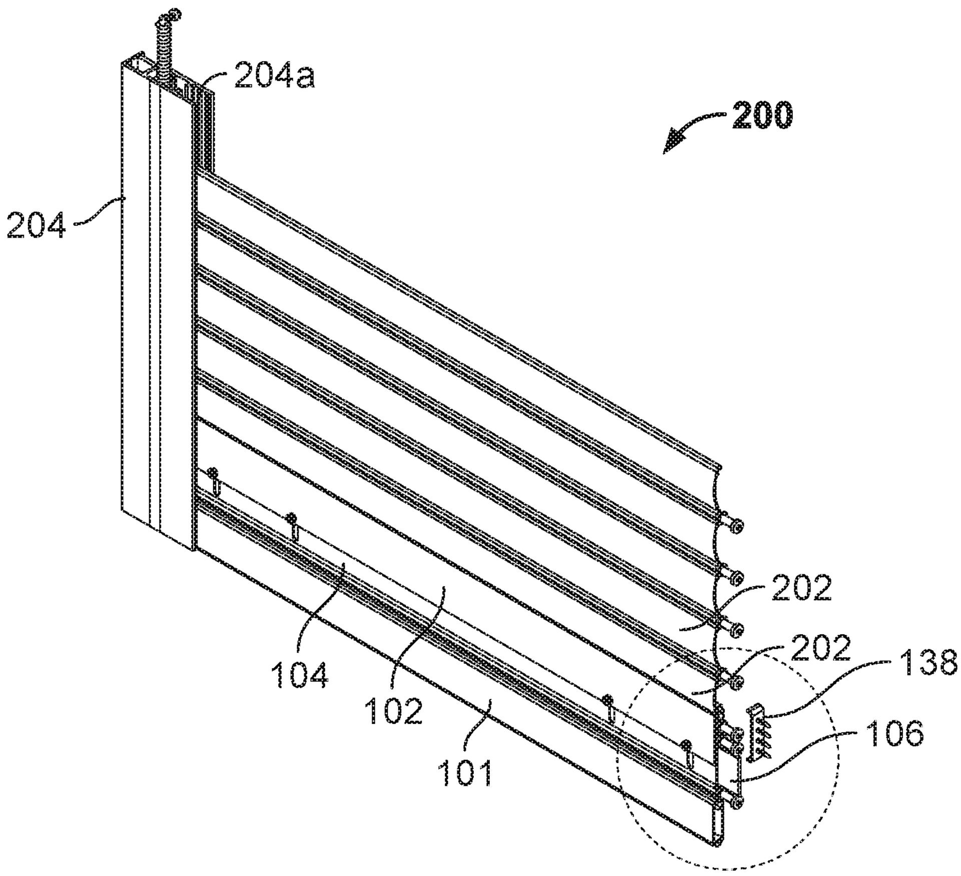
FIG. 6 is a partial orthographic view of a rolling shutter system including the lock slat of FIG. 1.
Figure 7:
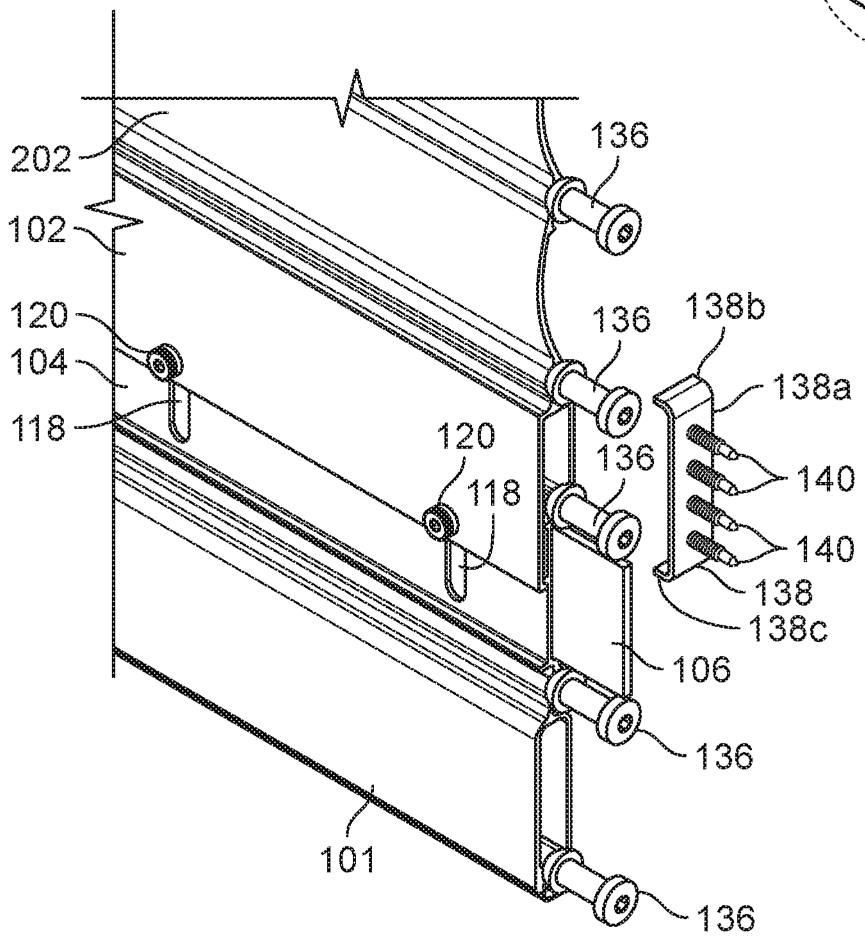
FIG. 7 is a detail view of the lock slat of FIG. 6.
Figure 8:
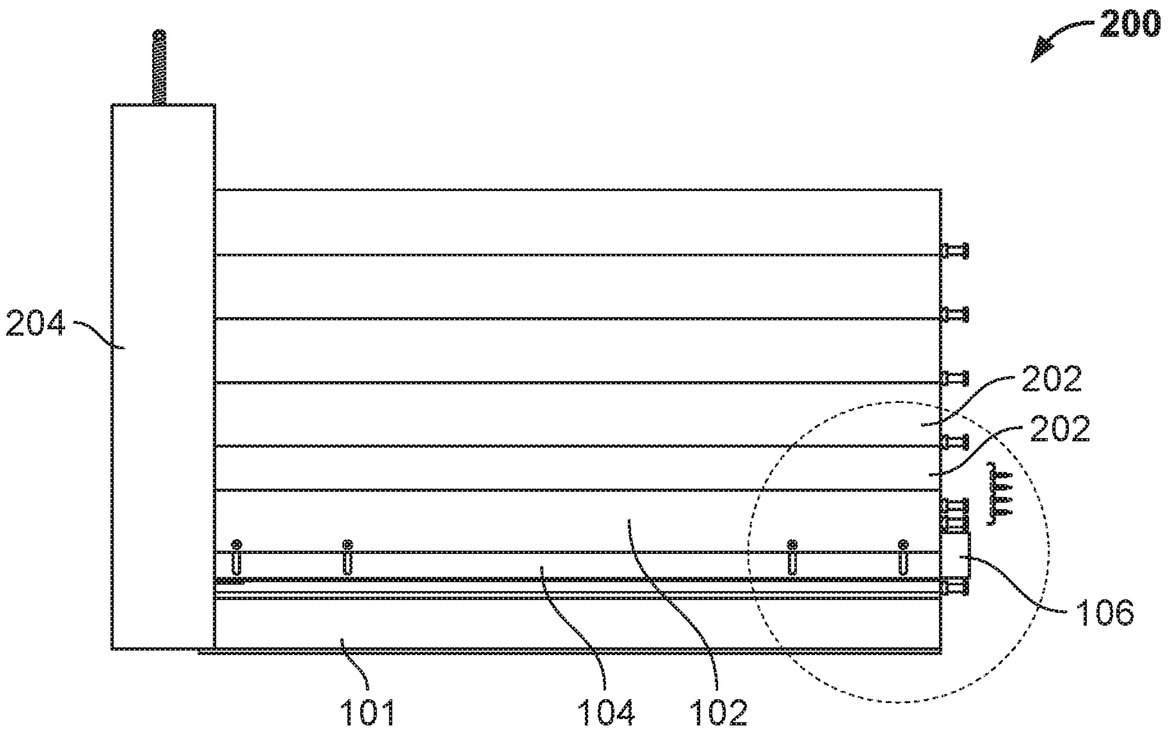
FIG. 8 is a front elevation view of the lock slat of FIG. 6.
Figure 9:
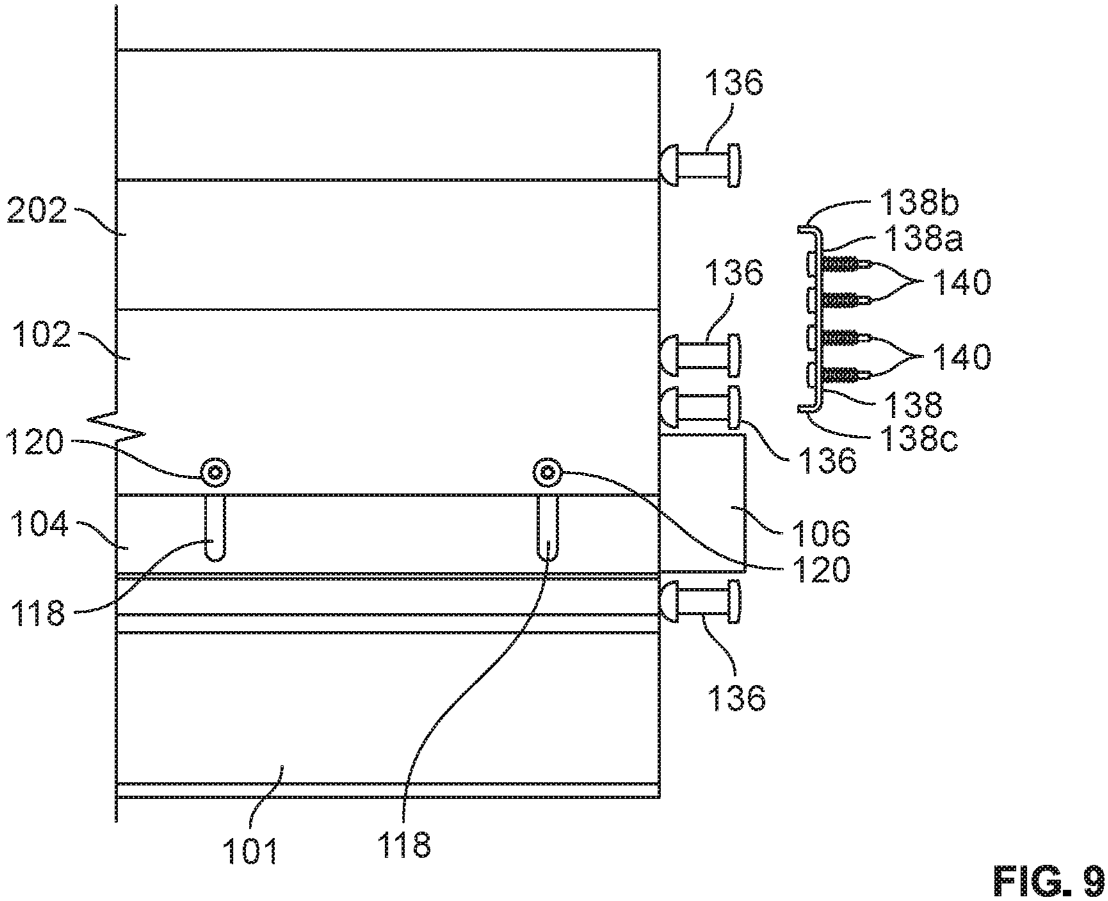
FIG. 9 is a detail view of the lock slat of FIG. 8.
Figure 10:
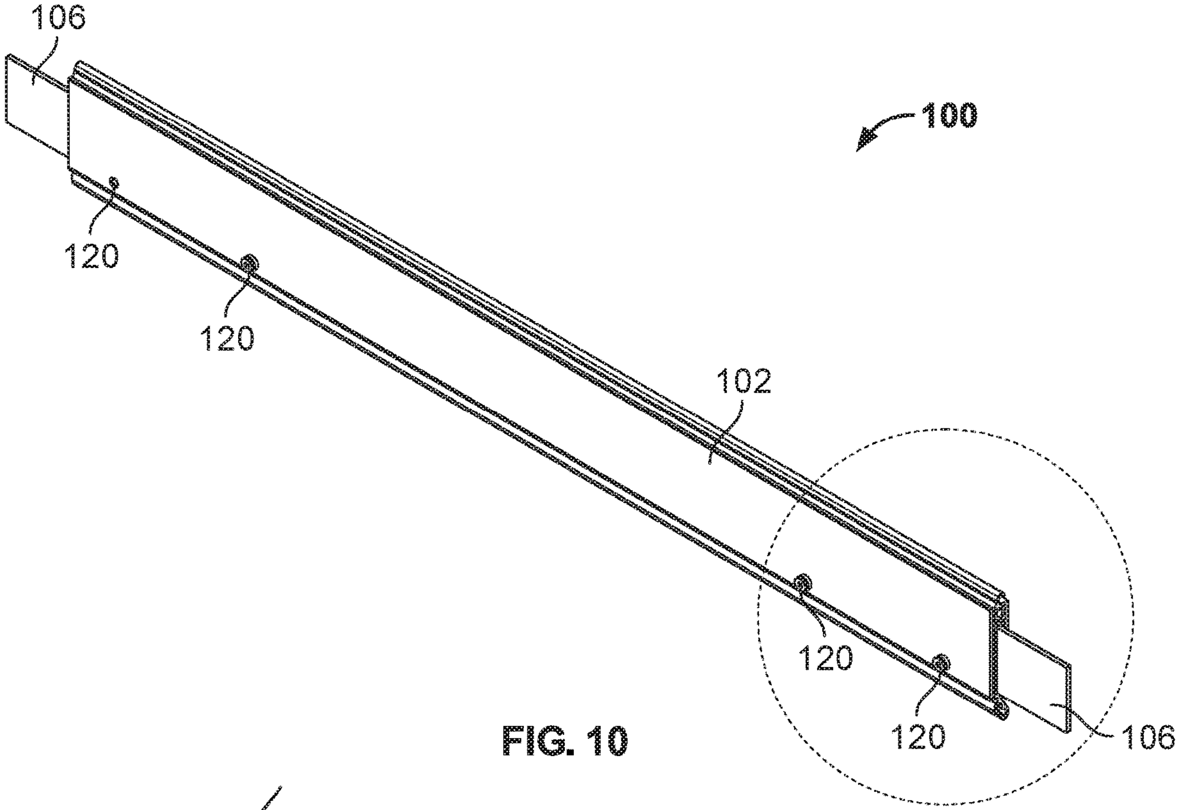
FIG. 10 is an orthographic view of the lock slat of FIG. 1 in a locked position.
Figure 11:
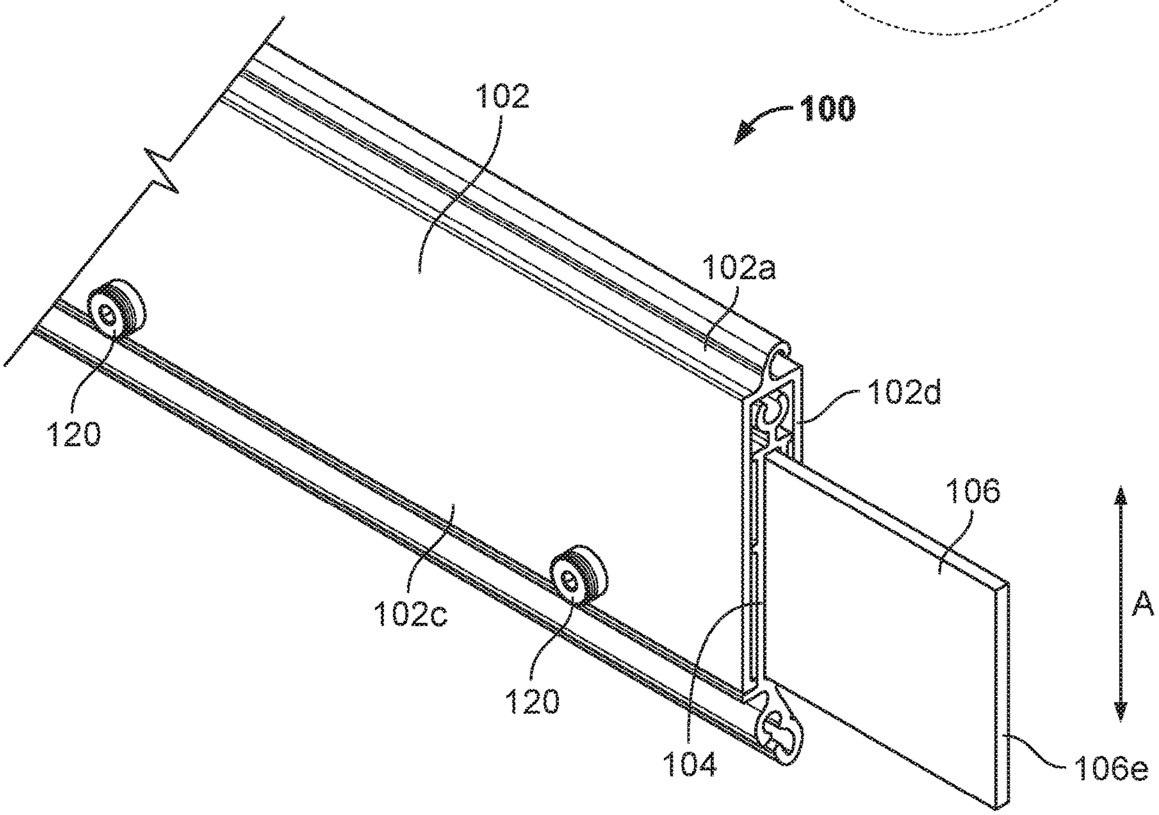
FIG. 11 is a detail view of the lock slat of FIG. 10.
Figure 12:
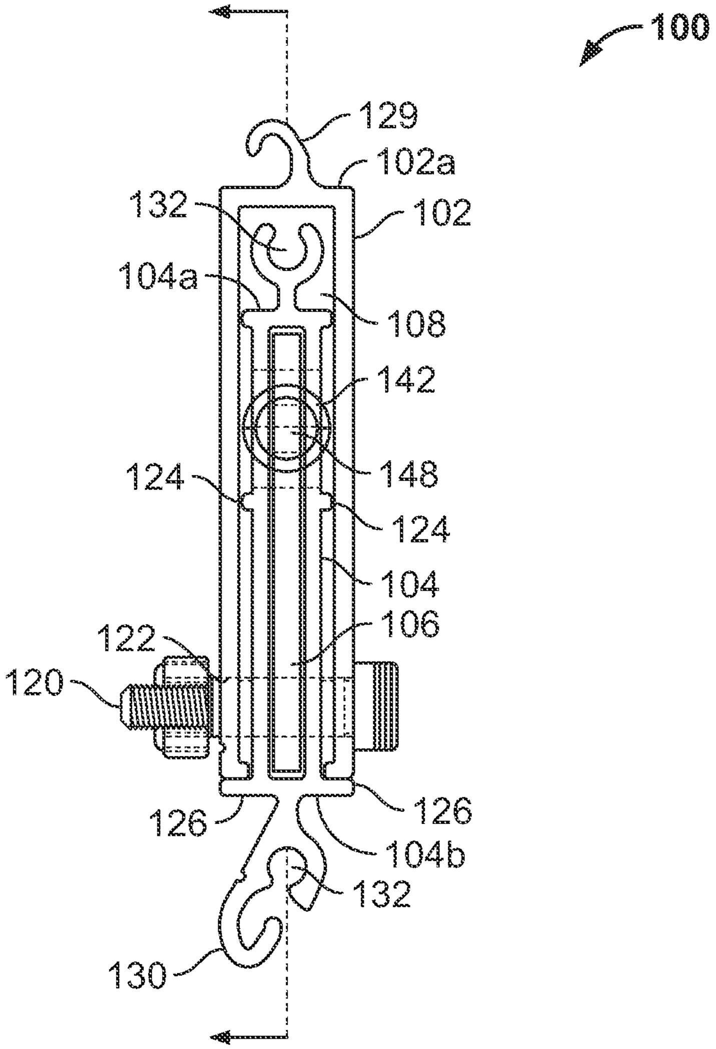
FIG. 12 is a side section view of the lock slat of FIG. 10.

As best shown in FIGS. 4 and 5, the longitudinal movement of lock bar 106 in body channel 114 and opening 116 is guided by one or more cam slots 128 formed in lock bar sides 106*c*. In one embodiment, cam slot 128 extends both transversely and longitudinally relative to lock bar 106 and body 104, to translate the transverse movement of the body in housing 102 into the longitudinal movement of the lock bar in body channel 114. In a preferred embodiment, lock bar cam slot 128 is a linear slot extending diagonally relative to body guide slot 118, and more preferably forms an angle of about 45°. Those of skill in the art will appreciate that cam slot 128 may have a different angle or alternative configurations, such as a simple, compound, or spiral curve.

Cam slot 128 has opposite ends 128*a* and 128*b*. In a preferred embodiment, cam slot end 128*a* is positioned proximal to lock bar top edge 106*a* and exterior end 106*e*, and cam slot end 128*b* is positioned proximal to lock bar bottom edge 106*b* and interior end 106*d*. Lock bar cam slot

128 and body guide slot 118 are aligned, such that cam pin 120 is received in both the guide slot and cam slot. In a further preferred embodiment, lock bar cam slot 128 and body guide slot 118 have the same transverse height, such that cam pin 120 may be simultaneously positioned at cam slot top end 128*a* and guide slot top end 118*a*, or at cam slot bottom end 128*a* and guide slot bottom end 118*b*.

The transverse movement of body 104 in housing channel 108 is coupled to the longitudinal movement of lock bar 106 in body channel 114. As body 104 moves transversely within housing channel 108, cam pin 120 travels simultaneously within body guide slots 118 and lock bar cam slots 128. Body guide slot 118 restricts cam pin 120 to move transversely to body 104 and lock bar 106. The transverse movement of cam pin 120 in lock bar cam slot 128 forces lock bar 106 to move longitudinally within body channel 114—either extended toward a locked position or retracted toward an unlocked position, as described below.

Lock slat 100 may include an engaging track and/or receiving track to integrate the lock slat in a rolling shutter system 200 comprising a series of shutter slats 202. In one embodiment, an engaging track 129 is positioned at housing edge 102*a*, and a receiving track 130 is positioned at body edge 104*b*. Engaging track 129 and receiving track 130 preferably have the same configuration as the engaging and receiving tracks of the other slats 202 in the rolling shutter 200. Examples of a shutter slat engaging track and receiving track are described in U.S. Pat. No. 9,074,411 to Miller et al.

Rolling shutter system 200 may also comprise an end retention system, and lock slat 100 may be integrated into the end retention system. In one embodiment, housing 102 and/or body 104 includes a receptacle 132 for receiving an end retention device. In a preferred embodiment, a receptacle 132 is positioned at body edge 104*a* and/or is incorporated in receiving track 130 positioned at body edge 104*b*. Receptacle 132 may form an opening or channel that is sized and shaped to receive an end retention device 136, such as a fastener and washer.

The end retention system may include a frame positioned at the perimeter of the opening covered by the rolling shutter, which comprises guide tracks 204 positioned at the sides of the opening. Guide tracks 204 have a channel 204*a* that is sized and shaped to slidingly receive the ends of the shutter slats 204, lock slat 100 and base slat 101, to align and hold the slats in position to cover the opening. Channel 204*a* is configured to retain end retention device 136 within guide track 204. Examples of end retention systems are described in U.S. Pat. Nos. 8,616,261 and 8,925,617 to Miller.

In one embodiment, rolling shutter system 200 includes a locking system that incorporates lock slat 100, and a lock stop 138 that is positioned to engage lock bar 106 and prevent the rolling shutter from being withdrawn from the closed position, as shown in FIGS. 6-9 and 16-21. In one embodiment, lock stop 138 is a flange secured to one or both sides of the opening or the frame of the opening, and is positioned to engage lock bar 106 when the rolling shutter is in the closed position. In a preferred embodiment, lock stop 138 is positioned within guide track channel 204*a*.

In one embodiment, lock stop 138 is an L-shaped or U-shaped flange having a base 138*a* and an arm or arms—e.g., top and bottom arms 138*b* and 138*c*. Base 138*a* is secured to the side(s) of the opening or frame by one or more fasteners 140, such as screws, rivets or other fasteners known in the art. Arms 138*b* and 138*c* project toward the opening and are position to engage lock bar 106 in the locked position and arrest the movement of the lock bar and rolling shutter 200 in guide track channel 204*a*, as described below.

Lock slat 100 is intended to be incorporated in the series of linked slats that comprise a rolling shutter, and is preferably positioned at or near the end of the rolling shutter that contacts the bottom of the opening when the shutter is in the closed position. FIG. 6-9 show an embodiment of a rolling shutter, with a lock slat 100 positioned adjacent to a base slat 101.

FIGS. 1-9 show lock slat 100 in the unlocked position. In operation, as the rolling shutter is raised from the opening to an open position, body 104 travels transversely (downward) out of housing channel 108 under the force of gravity, and lock slat 100 automatically extends telescopically in height toward an unlocked position. As body 104 extends away from housing 102, cam pin 120 travels upward within guide slot 118 toward top end 118*a*. In one embodiment, body rib 124 is positioned to contact internal lip 112 of housing opening 110 in the unlocked position, which prevents the further extension and withdrawal of body 104 from housing 102.

Cam pin 120 simultaneously travels transversely within lock bar cam slot 128. As cam pin 120 travels upward toward cam slot top end 128*a*, the cam slot forces lock bar 106 to move longitudinally within body channel 114. Cam slot end 128*a* is positioned proximal to lock bar end 106*e*, such that lock bar 106 is retracted toward or into body channel 114. In the fully unlocked position, lock slat 100 is at its maximum telescopic height, and cam pin 120 is positioned at guide slot top end 118*a* and cam slot top end 128*a*. Lock bar 106 (end 106*d*) is retracted toward body channel 114, and away from engagement with stop 138 to allow movement of lock slat 100 and rolling shutter 200 in guide track channel 204*a*.

FIGS. 10-21 show lock slat 100 in the locked position. As rolling shutter 200 is lowered to a closed position and contacts the bottom of the opening, the movement of body 104 stops while slats 202 above and housing 102 continue to move downward. Body 104 is forced to travel transversely (upward) into housing channel 108, and lock slat 100 automatically retracts telescopically in height toward a locked position. As body 104 moves upward in housing channel 108, cam pin 120 travels downward within guide slot 118 toward bottom end 118*b*. In one embodiment, body flange 126 is positioned to contact edge 102*b* of housing 102 and prevent the further movement of body 104 into housing channel 108—e.g., so that edge 104*b* is not fully withdrawn into channel 108, which may interfere with coupling to another slat.

Cam pin 120 simultaneously travels transversely downward within lock bar cam slot 128 toward bottom end 128*b*. The downward movement of pin 102 in cam slot 128 forces lock bar 106 to move longitudinally within body channel 114. Cam slot end 128*b* is positioned proximal to lock bar end 106*d*, such that lock bar 106 is extended away from or out of body channel 114 and toward the side of the opening or guide track 204. In the fully locked position, lock slat 100 is retracted to its minimum telescopic height, and cam pin 120 is positioned at guide slot bottom end 118*b* and cam slot bottom end 128*b*. Lock bar 106 (end 106*d*) is extended away from body channel 114, and into position to engage stop 138 (e.g., bottom arm 138*c*) and arrest the movement of lock slat 100 and rolling shutter 200 in guide track channel 204*a*.

Figure 13:
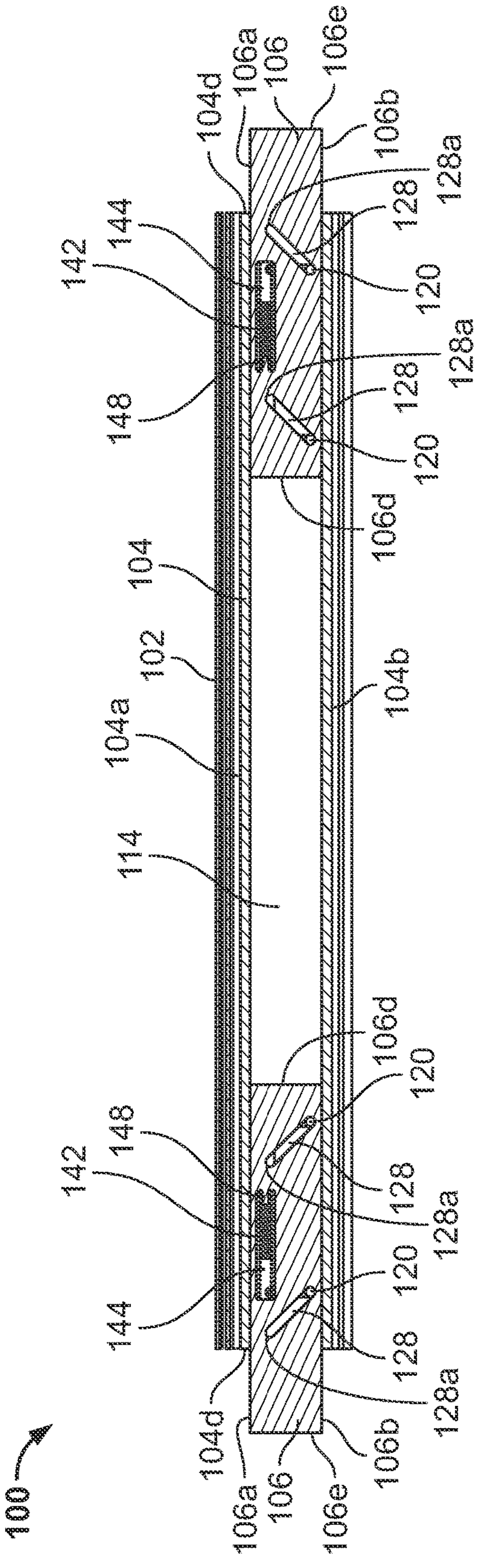
FIG. 13 is a front section view of the lock slat of FIG. 10.
Figure 14:
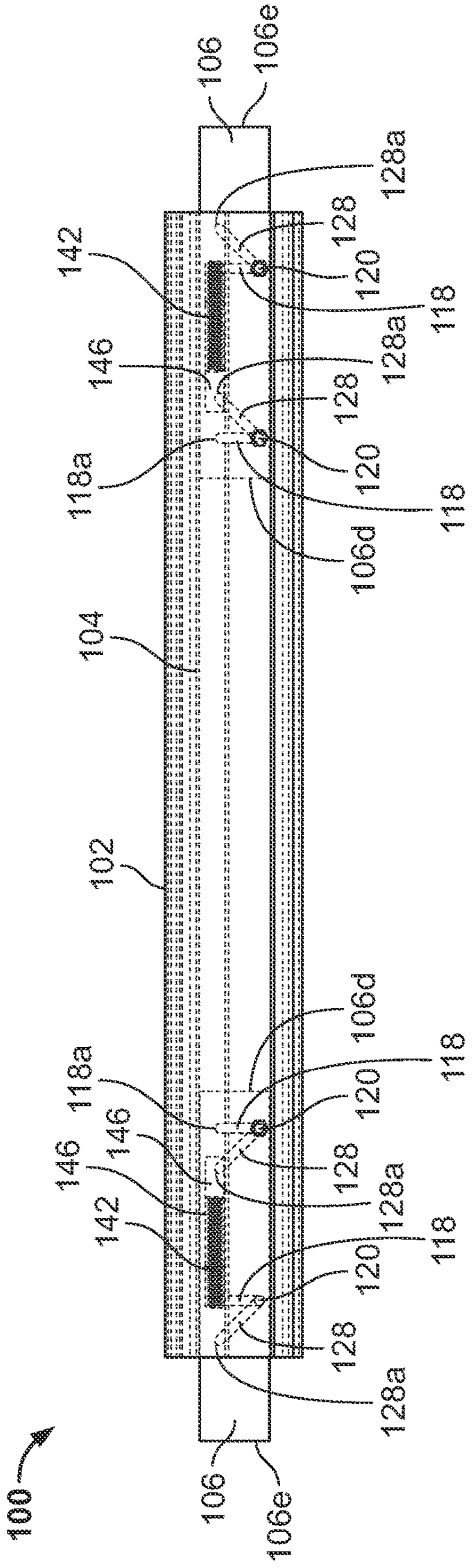
FIG. 14 is a front elevation view of the lock slat of FIG. 13, showing hidden lines.
Figure 15:
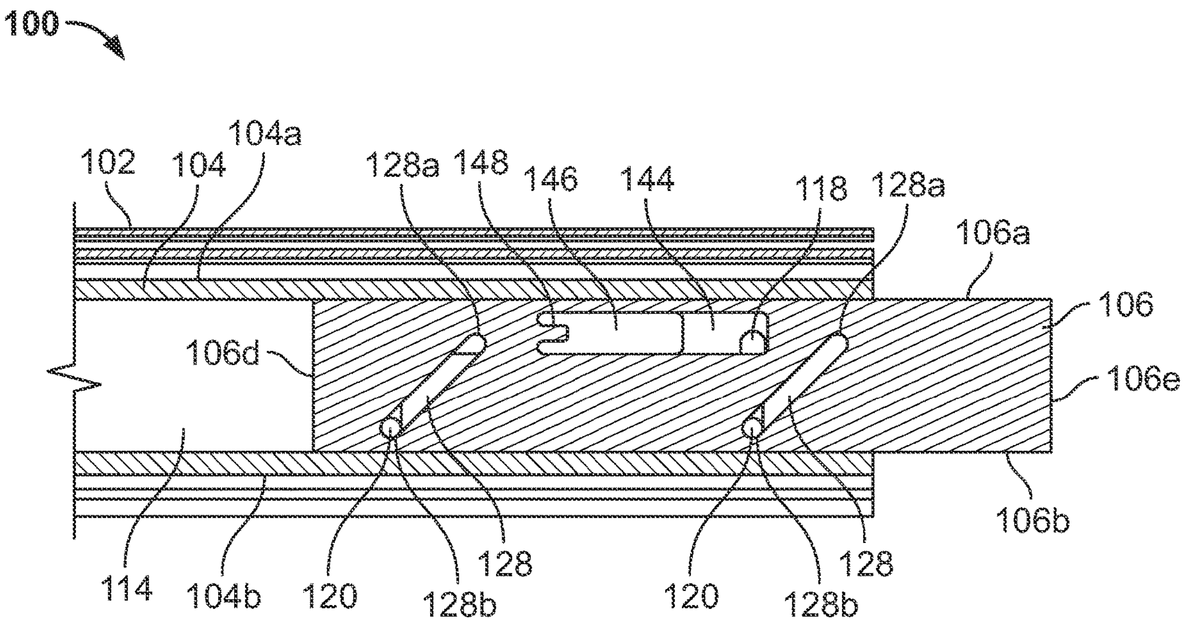
FIG. 15 is a detail front section view of the lock slat of FIG. 13, without the lock bar biasing spring.
Figure 16:
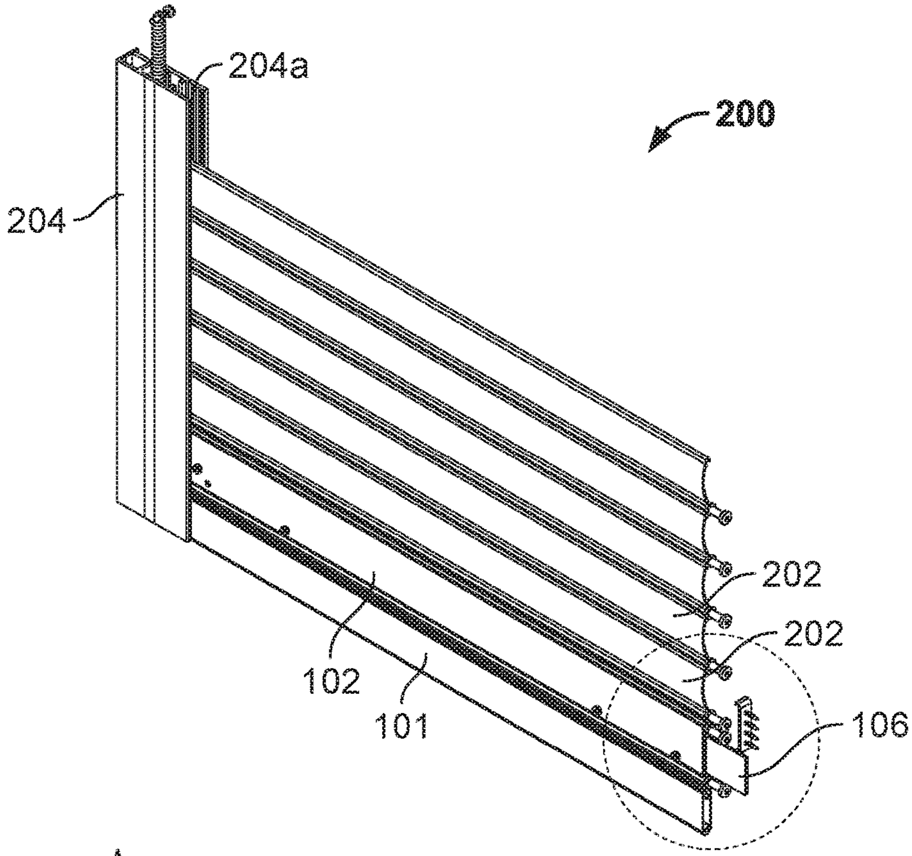
FIG. 16 is a partial orthographic view of a rolling shutter system including the lock slat of FIG. 10.
Figure 17:
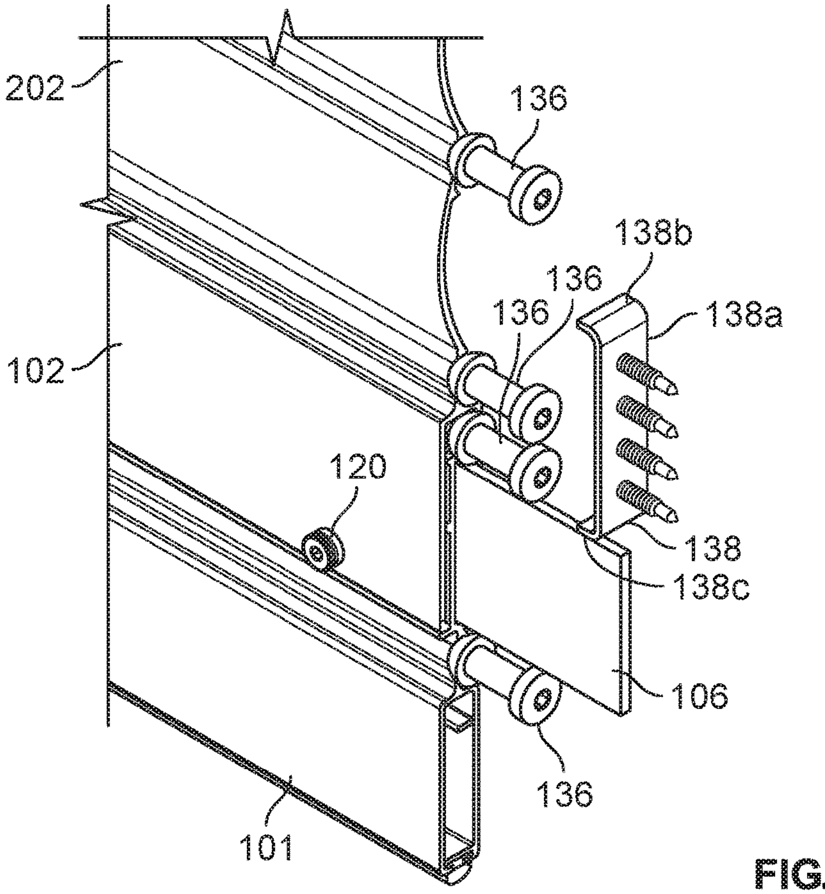
FIG. 17 is a detail view of the rolling shutter system of FIG. 16.
Figure 18:
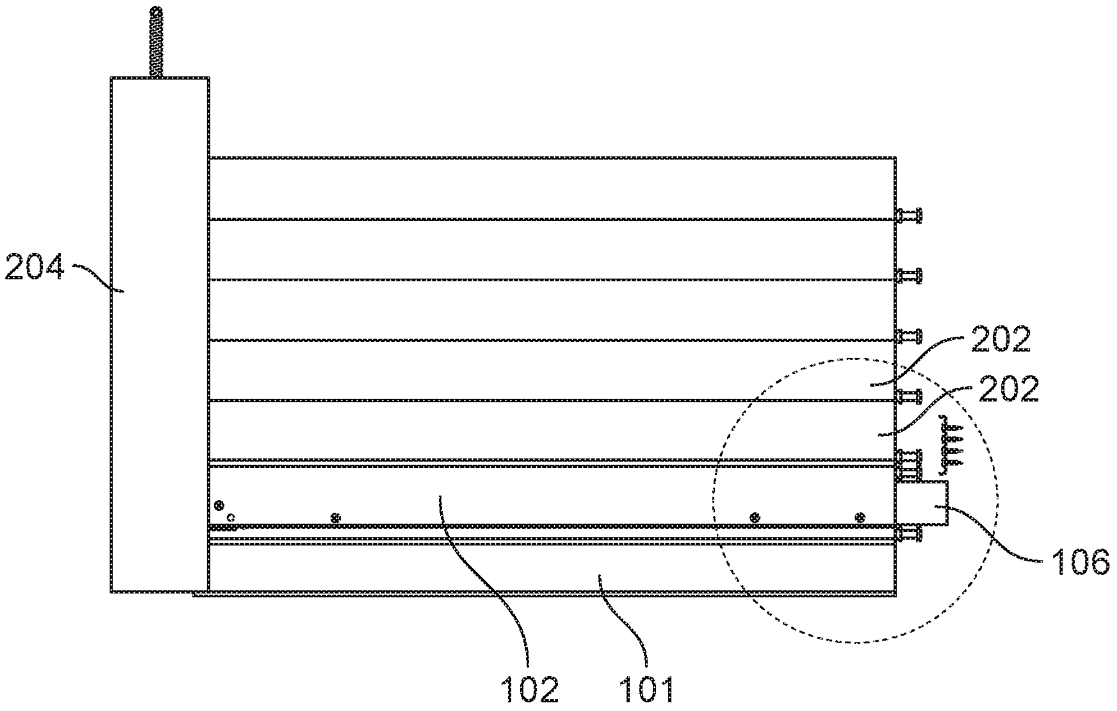
FIG. 18 is a front elevation view of the rolling shutter system of FIG. 16.
Figure 19:
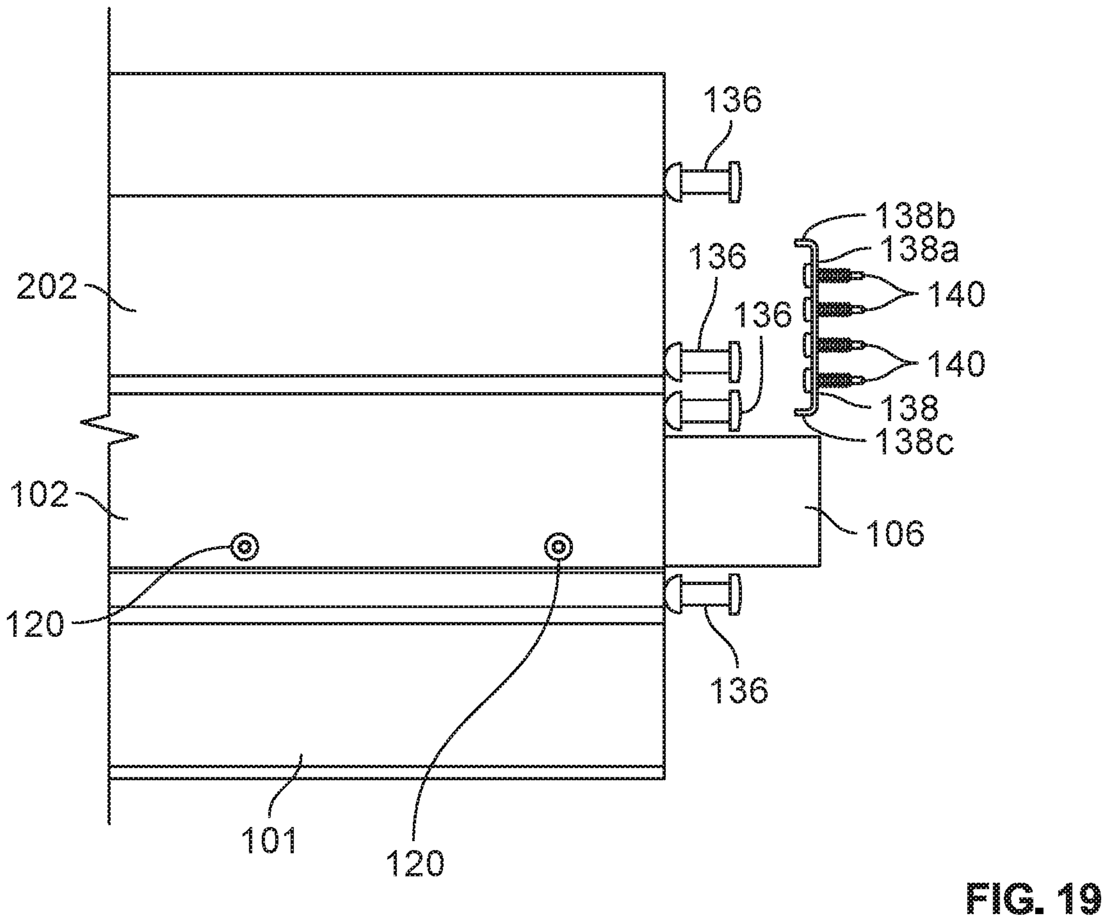
FIG. 19 is a detail view of the rolling shutter system of FIG. 18.

In one embodiment, lock bar 106 may be biased toward the unlocked position to facilitate the automatic unlocking of lock slat 100 as rolling shutter 200 is raised toward an open position. FIGS. 4, 5, 13, and 14 show an embodiment of a lock slat 100 that includes a spring 142 which biases the movement of lock bar 106 into body channel 114. As best shown in FIG. 15, spring slots 144 and 146 are respectively formed in lock bar 106 and body 104, that overlap to form a spring space for receiving spring 142. In one embodiment, spring 142 is a cylindrical coiled spring that is configured to exert a longitudinal force within spring slots 144 and 146. Lock bar 106 may include a pin 148 that projects into spring slot 144 for receiving cylindrical spring 142, to retain the spring in the spring slot.

When lock bar 106 is in the unlocked position, spring slots 144 and 146 are aligned with maximum overlap and spring space, and spring 142 is at its greatest expansion and has minimum compression (FIGS. 4 and 5). As lock bar 106 moves toward the locked position, spring slot 144 moves relative to spring slot 146, and the spring space and spring 142 are increasingly compressed (FIGS. 13-15). In the locked position, spring slots 144 and 146 have minimum overlap and spring space, and spring 142 has maximum compression. The compression of spring 142 exerts a force on lock bar 106 that biases the lock bar back toward the unlocked position.

Figure 20:
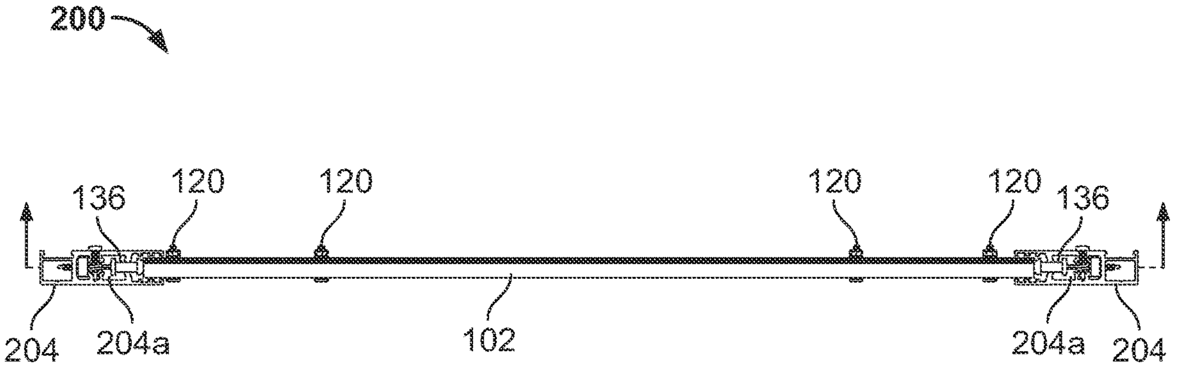
FIG. 20 is a top section view of a rolling shutter system including the lock slat of FIG. 10.
Figure 21:
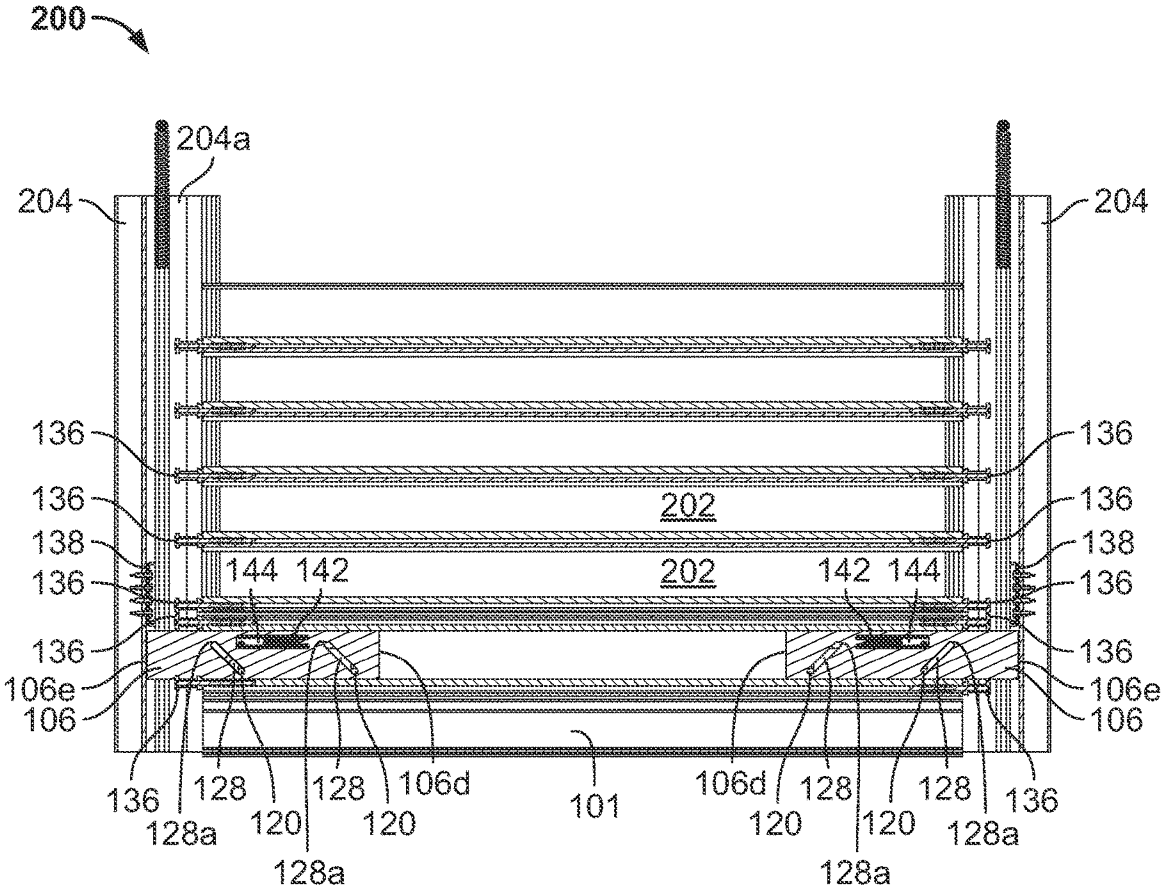
FIG. 21 is a front section view of the rolling shutter system of FIG. 20.

FIGS. 20 and 21 show an embodiment of a lock slat 100 with two lock bars 106 having mirror image configurations, that are positioned at the opposite ends 104*d* of body 104. Two lock stops 138 may be positioned to engage each lock bar 106 in the locked position. The mirror image configurations of cam slots 128 in the two lock bars 106 causes the lock bars to move in opposite directions as cam pins 120 travel in the cam slots. As lock slat 100 extends to its maximum height and cam pins 120 travel upward in cam slots 128, the lock bars 106 at opposite ends 104*d* of body 104 are simultaneously retracted to the unlocked position. As lock slat 100 retracts to its minimum height and cam pins 120 travel downward in cam slots 128, the lock bars 106 at opposite ends 104*d* of body 104 are simultaneously extended to the locked position.

The locking system provides an automatic locking/unlocking function that operates when a lifting force is applied to the rolling shutter from above or below the lock slat, or under the downward force of the rolling shutter. Lock slat 100 is urged away from the locked position when the rolling shutter is raised from above the lock slat (e.g., when receiving a shutter opening force from the top), but is urged toward the locked position when forced upward from below the lock slat (e.g., prying from the bottom). Lock slat 100 is also urged toward the locked position when the rolling shutter moves to the closed position and reaches the bottom of the opening. The rolling shutter exerts a downward force on lock slat 100, while the bottom of the opening arrests the movement of the lock slat and effectively operates as an upward force from below the lock slat.

When lock slat 100 is located at the appropriate position along guide track 204, the lock slat may engage a receiver in the guide track (e.g., stop 138) to provide locking functionality and resist attempts to improperly raise the rolling shutter to an open position—e.g., by prying or levering upward the bottom or base slat 101 of rolling shutter 200. The upward force on the bottom or base slat 101 of rolling shutter 200, forces body 104 upward into channel 108 of housing 102, and reinforces the movement of lock bar 106 toward the locked position. As the rolling shutter and lock slat 100 are improperly forced upward, lock bar 106 is raised into engagement with stop 138 (e.g., bottom arm 138*c*), which prevents the further upward movement of the lock bar and secures the rolling shutter in the closed position.

In some cases, contact between lock bar 106 and body 104 may interfere with the free movement of the lock bar in body channel 114 between the locked and unlocked positions. Body channel 114 has an inner bottom surface 114*a* that is proximal to lock bar bottom edge 106*b* (FIG. 4). As body 104 is forced transversely upward into housing channel 108, body channel inner surface 114*a* is forced into contact with lock bar bottom edge 106*b*, which creates friction that may interfere with the longitudinal sliding extension of the lock bar to the locked position. The greater the upward force on body 104, the greater the friction and resistance to the movement of lock bar 106.

The sliding movement of lock bar 106 in body channel 114 may be improved by using lubricants (e.g., grease). Lock bar 106 and/or body 104 may also be formed with materials having increased lubricity. For example, a plastic sleeve may be introduced within body channel 114 or surrounding lock bar 106. Alternatively, lock slat 100 may be configured to reduce the contact between lock bar 106 and body 104. For example, lock bar bottom edge 106*b* may be formed with one or more small bumps that reduce the contact surface area with body channel inner surface 114*a*. Although these alternatives reduce friction, they still experience an increase in resistance as body 104 is forced upward into housing channel 108.

Figure 22:
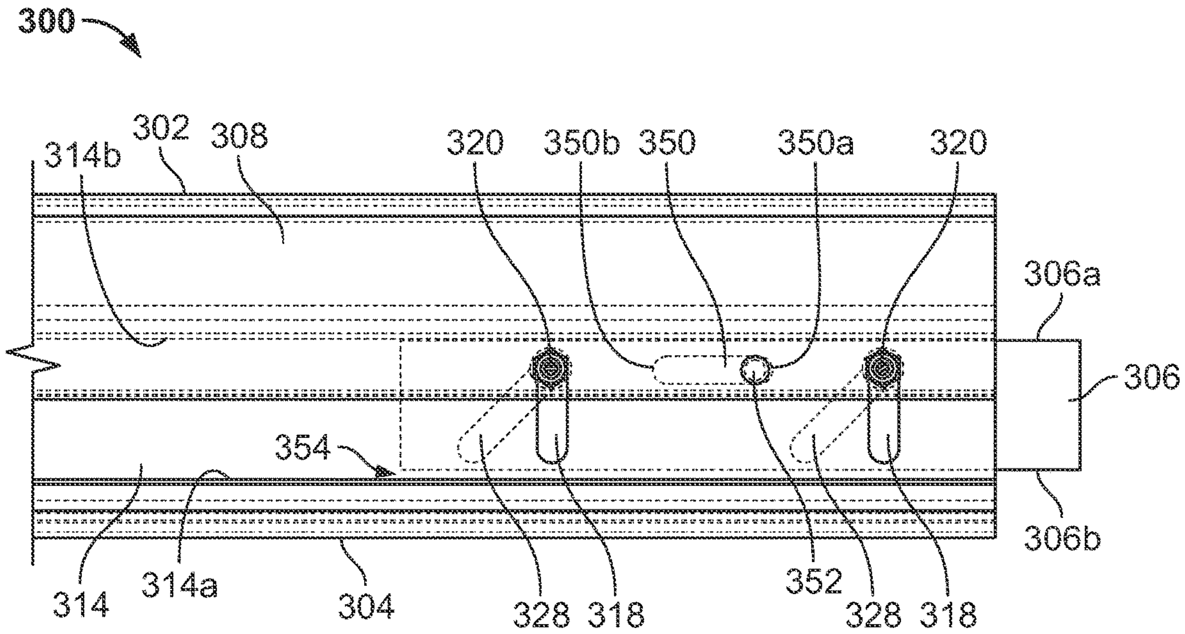
FIG. 22 is a partial front elevation view of an alternative embodiment of a lock slat, showing hidden lines.
Figure 23:
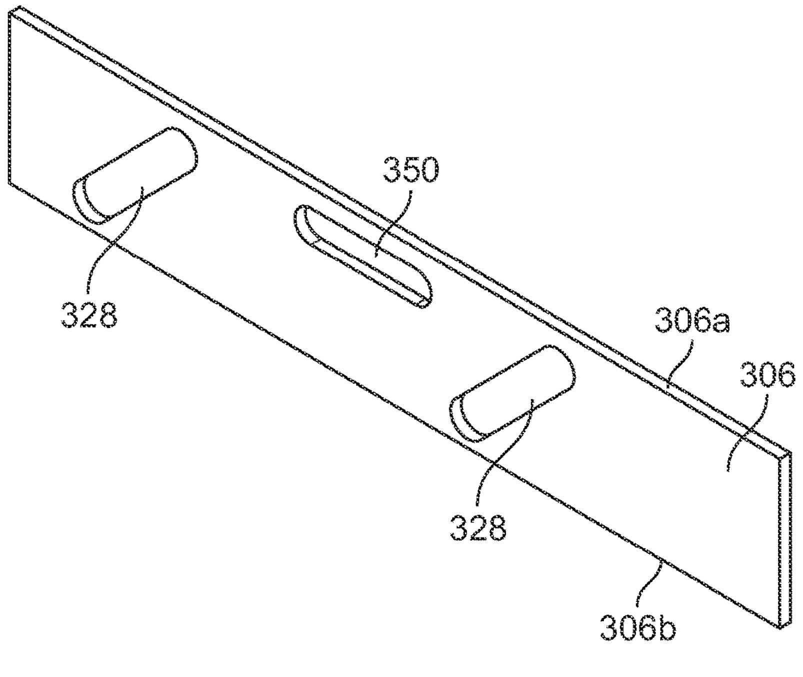
FIG. 23 is an orthographic view of the lock bar of the lock slat of FIG. 22.

FIGS. 22 and 23 show an embodiment of a lock slat 300 that minimizes the contact surface between lock bar 106 and body 104. Lock slat 300 has a similar configuration and operation to lock slat 100, with a housing 302, body 304, and lock bar 306. Body 304 is received in a housing channel 308, and lock bar 306 is received in a body channel 314. The transverse movement of body 304 in housing channel 308 is coupled and translated to the longitudinal movement of lock bar 36 in body channel 314, by the travel of cam pin 320 in body guide slots 318 and lock bar cam slots 328.

Lock bar 306 further includes a longitudinal support slot 350 with opposite ends 350*a* and 350*b*. A support pin 352 extends from body 304 into channel 314, and is positioned in slot 350. Support pin 352 travels in support slot 350 as lock bar moves within body channel 314 between the locked and unlocked positions. In one embodiment, support pin 352 is positioned at support slot end 350*a* when lock bar 306 is retracted in the closed position, and is positioned at end 350*b* when the lock bar is extended to the locked position.

Lock bar 306 is supported in body channel 314 by support pin 352, and has a height that is less than the height of body channel 314, such that lock bar bottom edge 306*b* and the body channel inner surface bottom 314*b* are separated by a gap 354. Lock bar support slot 350 preferably extends parallel to the longitudinal axis of body channel 314, such that the separation is maintained as lock bar 306 moves within body channel 314 between the locked and unlocked positions. In a further preferred embodiment, support slot 350 is positioned between lock bar cam slots 328, such that cam pins 320 positioned in the cam slots restrict the rotation of lock bar 306 on support pin 352, and prevents the inadvertent contact of lock bar bottom edge 306*b* with the body channel inner surface. In one embodiment, both lock bar top edge 306*a* and bottom edge 306*b* are respectively separated from contact with the body channel inner surface top 314*a* and bottom 314*b*.

The separation of lock bar 306 from the inner surface of body channel 314 effectively reduces the contact between the lock bar and body 304 to the point contact of support pin 352 in support slot 350. The reduction of contact surface area between lock bar 306 and body 304 minimizes friction and resistance to the movement of the lock bar in body channel 314. The gap 354 separating lock bar 306 and the inner surface of body channel 314 also avoids an increase in friction and resistance as body 304 is forced upward into housing channel 308.

Figure 24:
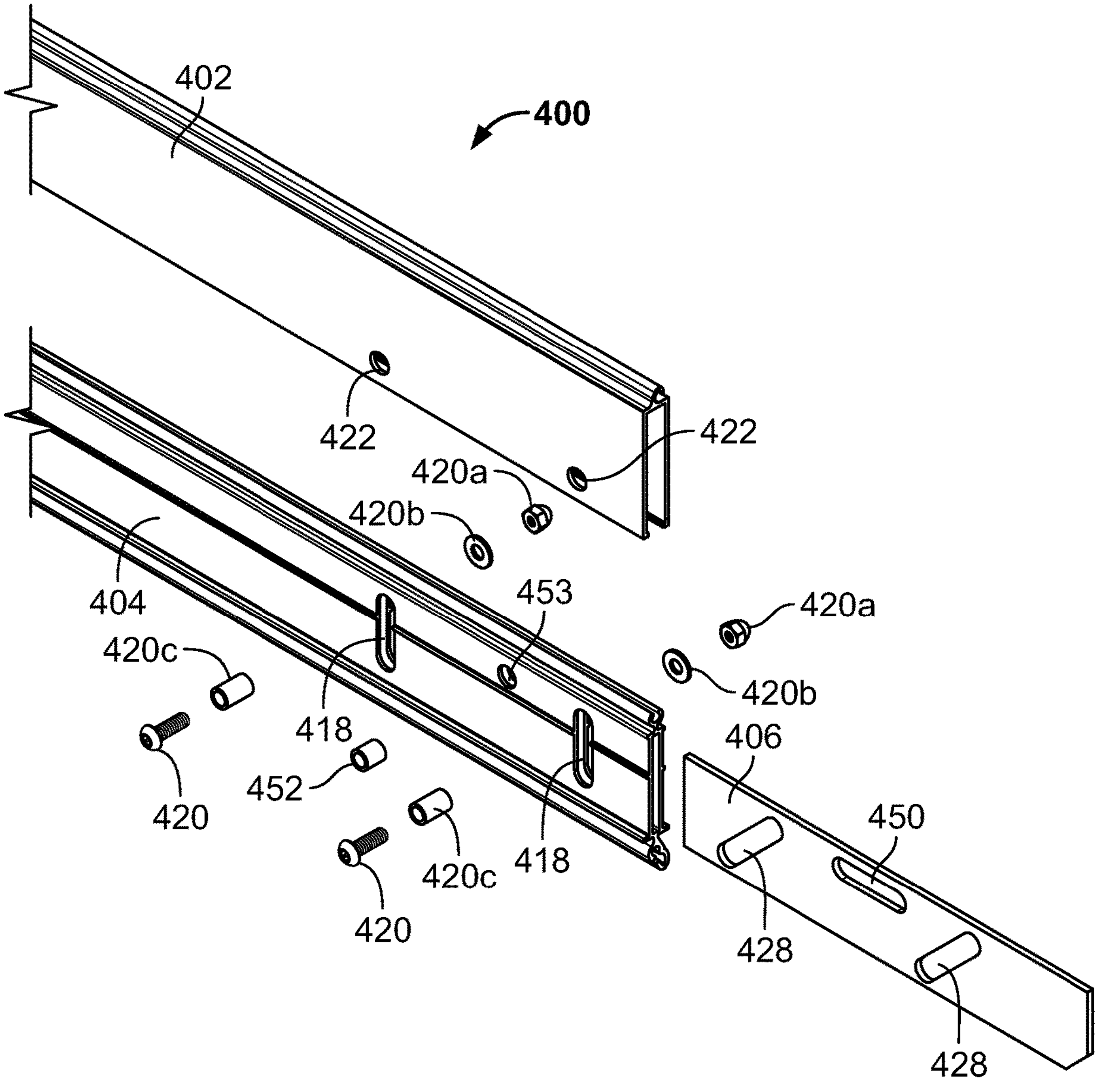
FIG. 24 is a partial exploded orthographic view of an alternative embodiment of a lock slat.

The lock slat may include one or more features to improve security and reliable operation. In one embodiment, the lock slat incorporates tamper resistant cam pins. FIG. 24 shows a lock slat 400 with a similar configuration to lock slat 300, that comprises a housing 402, body 404, and lock bar 406. Cam pins 420 are received in housing openings 422, body guide slots 418, and lock bar cam slots 328. In a preferred embodiment, cam pins 420 are tamper resistant screws, such as a tamper resistant button head Torx bolt that increases the difficulty of removal. The bolt may be secured with a nut 420*a*, such as an acorn nut. In a preferred embodiment, nut 420*a* is secured to bolt 420 using an adhesive, such as Loctite®. A washer may also be threaded onto the shaft of bolt 420, and positioned between nut 420*a* and housing 402 to increase the surface area and facilitate tightening of the nut.

In another embodiment, a cylindrical tube or roller 420*c* may be threaded onto and encircles the shaft of cam pins 420 to facilitate the movement of the cam pins in body guide slots 418 and lock bar cam slots 328. Cylindrical roller 420*c* has an inner channel that is sized and shaped to receive the shaft of cam pin 420, and an outer diameter that is sized to be received in body guide slot 418 and lock bar cam slot 328. In a preferred embodiment, roller 420*c* has a length that extends the width of housing 402. Openings 422 are formed in the sides of housing 402, that are sized and shaped to receive and support roller 420*c* in the housing. In a further preferred embodiment, roller 420*c* rotates freely on the shaft of cam pin 420. The independent movement of roller 420*c* on cam pin 420 reduces catching and resistance to movement as the cam pin travels in body guide slot 418 and lock bar cam slot 328.

The lock bar support pin may similarly be configured as a cylindrical roller 452. Roller 452 has an outer diameter that is sized and shaped to be received in lock bar longitudinal support slot 450, and has a length that extends the width of body 404. Openings 453 are formed in the sides of body 404, that are sized and shaped to receive and support roller 452 in the body. A lubricant or grease may be applied to the exterior of rollers 420*c* and/or 452 to decrease friction and facilitate the movement of the rollers in slots 418, 328, and 450, and to extend the lifespan of the rollers. Lubricant or grease may similarly be applied to the inner channel of rollers 420*c* to facilitate rotation on cam pins 420.

In a further embodiment, lock bar 406 is configured to minimize the improper engagement of the lock bar with the lock stop. As described above, the lock bar is designed to automatically retract and remain in an unlocked position until the rolling shutter contacts the bottom of the opening in a fully closed position. In some circumstances, the lock bar may inadvertently extend and become stuck or fixed in the locked position while the rolling shutter is open or partially open. As the rolling shutter is lowered to the closed position, the extended lock bar will improperly engage the lock stop and prevent the rolling shutter from reaching the bottom of the opening and fully closing.

Figure 25:
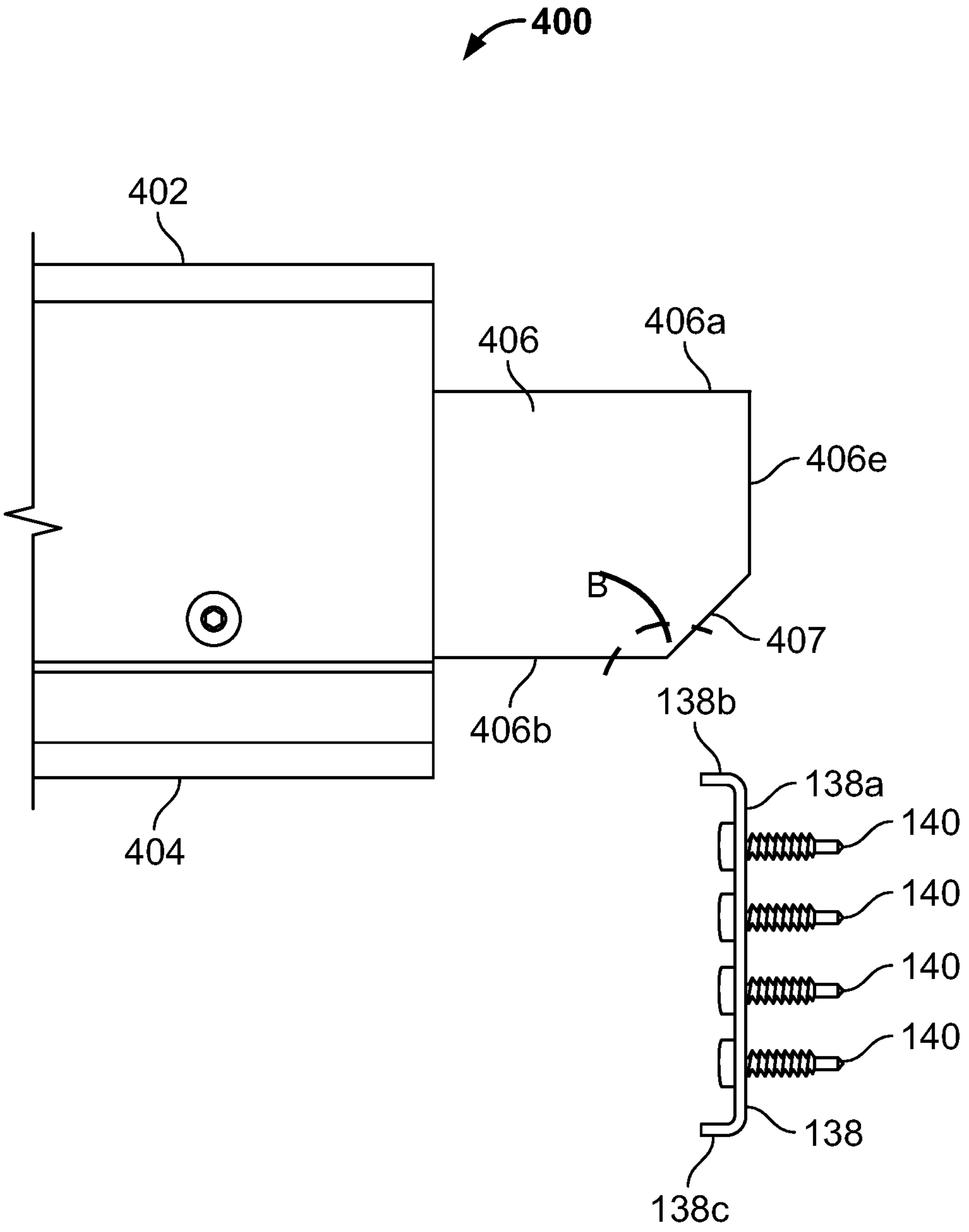
FIG. 25 is a partial front elevation view of the lock slat of FIG. 24.

FIG. 25 shows an embodiment of lock slat 400 that is configured to self-correct the improper engagement of lock bar 400 with lock stop 138. Lock slat 400 is positioned above lock stop 138, such as when the rolling shutter is in an open or partially open position. Lock bar 406 has opposite top and bottom edges 406*a* and 406*b*, and an exterior end 406*e* that is shown improperly extended to the locked position. Lowering the rolling shutter and lock slat 400 will cause lock bar 406 to improperly engage lock stop 138 (top arm 138*b*).

Lock bar 406 has a chamfer or angled portion that extends at an oblique angle to the direction of travel of the rolling shutter, that operates to deflect the lock bar from improper engagement with lock stop 138. Lock bar exterior end 406*e* comprises an angled portion 407 that forms at an obtuse interior angle "B" with bottom edge 406*b*. In a preferred embodiment, angled exterior end 407 is positioned adjacent to bottom edge 406*b*—e.g., forms a chamfered corner between exterior end 406*e* and bottom edge 406*b*. In a further preferred embodiment, interior angle B is about 135°, such that corner 407 extends at about a 45° angle to the direction of travel of the rolling shutter.

When lock bar 406 is extended to the locked position and the rolling shutter is lowered toward lock stop 138, angled portion 407 of exterior end 406*e* is positioned to engage lock stop 138 (top arm 138*b*). The downward movement of the rolling shutter forces angled portion 407 to slide on lock stop 138, which causes lock bar 406 to retract from the locked position (i.e. toward the unlocked position) and allows lock slat 400 to be lowered past the lock stop.

While the disclosure has been described in terms of exemplary embodiments, those skilled in the art will recognize that the disclosure can be practiced with modifications in the spirit and scope of the instant disclosure. These examples given above are merely illustrative and are not meant to be an exhaustive list of all possible designs, embodiments, applications or modifications of the disclosure.

What is claimed is:

1. A locking system for a rolling shutter, comprising a housing having a longitudinal housing channel;

a body having opposite first and second ends, a longitudinal body channel with an opening at the first end, and a first slot within the body, wherein the body is positioned in and moveable transversely within the housing channel;

a lock bar having a second slot within the lock bar, wherein the lock bar is positioned within the body channel and opening and moveable longitudinally to the body and housing between a locked position extending away from the body and an unlocked position retracted toward the body; and a pin coupled to the housing and extending into the housing channel, the pin received in the first and second slots;

wherein the travel of the pin within the first and second slots couples the movement of the body to the movement of the lock bar, and wherein the travel of the pin within the first slot guides the transverse movement of the body in the housing, and the travel of the pin within the second slot moves the lock bar between the locked and unlocked positions.

2. The locking system of claim 1, wherein the body is moveable transversely within the housing channel between a first position extending away from the housing and a second position retracted toward the housing; and wherein the movement of the body to the first position moves the lock bar to the unlocked position, and the movement of the body to the second position moves the lock bar to the locked position.

3. The locking system of claim 1, wherein the second slot is a cam slot that translates the transverse movement of the body within the housing into the movement of the lock bar longitudinally to the body.

4. The locking system of claim 3, wherein the second slot is a linear slot extending diagonally relative to the first slot.

5. The locking system of claim 3, wherein the second slot is a linear slot that extends at an angle of about 45° relative to the first slot.

6. The locking system of claim 1, wherein the pin comprises a bolt with a shaft and a cylindrical roller encircling the shaft, and wherein the shaft and roller extend into the housing channel and are received in the first and second slots.

7. The locking system of claim 6, wherein the roller rotates freely on the shaft.

8. The locking system of claim 1, wherein the movement of the lock bar is biased toward the unlocked position.

9. The locking system of claim 8, further comprising a spring, wherein the lock bar has a first spring slot and the body has a second spring slot, the first and second spring slots overlapping to form a spring space for receiving the spring, and wherein the movement of the lock bar to the locked position reduces the spring space and compresses the spring to bias the lock bar to the unlocked position.

10. The locking system of claim 1, further comprising a stop positioned to engage the lock bar in the locked position.

11. The locking system of claim 10, wherein the lock bar has opposite top and bottom edges, and an end that is extended away from the body in the locked position, and wherein the exterior end has an angled portion that forms an obtuse interior angle with the bottom edge.

12. The locking system of claim 11, wherein the angled portion is positioned adjacent to the bottom edge, and forms an interior angle of about 135° with the bottom edge.

13. The locking system of claim 1, wherein the lock bar has a bottom edge, and the body channel has an inner bottom surface proximal to the lock bar bottom edge, and wherein the lock bar bottom edge and the body channel inner bottom surface are separated by a gap.

14. The locking system of claim 13, wherein the body channel has a first height and the lock bar has a second height that is less than the first height.

15. The locking system of claim 14, wherein the lock bar has a support slot, and the body has a support pin that extends into the body channel and is received in the support slot, and wherein the lock bar is supported in the body channel by the support pin such that the lock bar bottom edge and the body channel inner bottom surface are separated by a gap.

16. A lock slat for a rolling shutter, comprising

- a housing having a longitudinal channel;
- a body positioned in and moveable transversely within the channel, the body having first and second body slots, a first end with a first opening, and a second end with a second opening;
- a first lock bar positioned within the first opening, and having a first lock bar slot;
- a second lock bar positioned within the second opening, and having a second lock bar slot; and
- first and second pins coupled to the housing and extending into the channel, the first pin received in the first body slot and the first lock bar slot, the second pin received in the second body slot and the second lock bar slot;
- wherein the first and second lock bars are moveable longitudinally to the body and housing between a locked position extending away from the body and an unlocked position retracted toward the body;
- wherein the travel of the first pin within the first and second slots couples the movement of the body to the movement of the lock bar, and wherein the movement of the first and second pins within the first and second body slots guides the movement of the body transverse to the housing, the movement of the first pin within the first lock bar slot moves the first lock bar between the locked and unlocked positions, and the movement of the second pin within the second lock bar slot moves the second lock bar between the locked and unlocked positions.

17. The locking system of claim 16, wherein the first and second lock bar slots are cam slots that translate the transverse movement of the body within the housing into the longitudinal movement of the first and second lock bars relative to the body and housing.

18. The locking system of claim 17, wherein the first and second lock bars have first and second lock bars slots with mirror image configurations.

19. The locking system of claim 17, wherein the transverse movement of the body within the housing is translated into the longitudinal movement of the first and second lock bars in opposite directions.

20. A rolling shutter system for covering a structure opening having a top, a bottom, and opposite sides, the rolling shutter comprising:

- a guide track positioned on at least one side of the structure opening;
- a stop positioned on the guide track; and
- the locking system of claim 1;
  - wherein the lock bar in the locked position extends away from the body and is positioned to engage the stop, and the lock bar in the unlocked position is retracted toward the body and away from engagement with the stop.

21. The rolling shutter system of claim 20, further comprising a plurality of slats, each slat having an engaging track, and a receiving track configured to receive the engaging track of another slat; and

- wherein the housing has an engaging track, and the body has a receiving track.

22. The rolling shutter system of claim 21, wherein the body has a first end, and a receiving track positioned at the first end with a receptacle for receiving an end retention device; and

- wherein the guide track has a guide track channel for receiving the end retention device.

23. The rolling shutter system of claim 21, wherein the body further comprises:

- a first end, a first edge positioned within the housing channel, and a second edge outside of the housing channel;
- a first receptacle positioned at the first edge, for receiving a first end retention device; and
- a receiving track positioned at second edge at the first end, and having a first receptacle for receiving a second end retention device;
- wherein the guide track has a guide track channel for receiving the first and second end retention devices.

* * * * *